(12) United States Patent
Nahum et al.

(10) Patent No.: US 7,707,738 B2
(45) Date of Patent: May 4, 2010

(54) DIGITAL RULER WITH LOW-FRICTION SLIDING CONTACT

(75) Inventors: Michael Nahum, Kirkland, WA (US); Michael Vilhauer, Kirkland, WA (US); Yuhua Ding, Bothell, WA (US); Casey Emtman, Kirkland, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 96 days.

(21) Appl. No.: 12/126,781

(22) Filed: May 23, 2008

(65) Prior Publication Data

US 2009/0288306 A1 Nov. 26, 2009

(51) Int. Cl.
*G01B 3/04* (2006.01)
*G01B 3/20* (2006.01)

(52) U.S. Cl. .............................. 33/700; 33/706; 33/784

(58) Field of Classification Search .................. 33/18.1, 33/19.1, 19.2, 19.3, 32.1, 32.2, 32.3, 483, 33/486, 492, 494, 700, 702, 706, 707, 708, 33/784

See application file for complete search history.

(56) References Cited

U.S. PATENT DOCUMENTS

| | | | | |
|---|---|---|---|---|
| 392,143 | A * | 10/1888 | Wright | .................. 33/32.2 |
| 4,095,273 | A * | 6/1978 | Gonzalez | .................. 708/105 |
| 4,212,000 | A | 7/1980 | Yamada | |
| 4,282,571 | A | 8/1981 | Giovannoli | |
| 4,374,622 | A | 2/1983 | Kashio | |
| 4,435,904 | A * | 3/1984 | Logan et al. | .................. 33/784 |
| 4,444,504 | A * | 4/1984 | Takizawa | .................. 356/619 |
| 4,519,138 | A * | 5/1985 | Held | .................. 33/32.1 |
| 4,922,063 | A | 5/1990 | Shimizu | |
| 4,941,267 | A | 7/1990 | Miller | |
| 4,974,164 | A | 11/1990 | Lewis | |
| 5,016,359 | A * | 5/1991 | Nagaoka et al. | ............... 33/702 |
| 5,519,393 | A | 5/1996 | Brandestini | |
| 5,647,135 | A | 7/1997 | Fuentes | |
| 6,429,792 | B1 | 8/2002 | Burton | |
| 6,865,820 | B2 * | 3/2005 | Burgschat et al. | ............. 33/706 |
| 7,102,086 | B2 | 9/2006 | Bick | |
| 2003/0047009 | A1 * | 3/2003 | Webb | .................... 73/862.541 |
| 2004/0080306 | A1 | 4/2004 | Fischer | |

FOREIGN PATENT DOCUMENTS

| | | | | |
|---|---|---|---|---|
| FR | 2390706 | A1 * | 12/1978 | |
| JP | 08014802 | A * | 1/1996 | |
| JP | 08184427 | A * | 7/1996 | |
| JP | 2001183130 | A * | 7/2001 | |
| JP | 2007163273 | A * | 6/2007 | |
| WO | WO 8201686 | A1 * | 5/1982 | |

\* cited by examiner

*Primary Examiner*—R. A. Smith
(74) *Attorney, Agent, or Firm*—Christensen O'Connor Johnson Kindness PLLC

(57) ABSTRACT

A low cost digital ruler with desirable ergonomic characteristics and accuracy. A low friction sliding position indicator includes a compliant element that forces its connection pads against the ruler's electronic scale contacts, to determining measurement positions. The position indicator includes an instrument receiving feature that engages a writing instrument and moves in conjunction with it, thereby measuring a line as it is drawn. A position indicator preload arrangement includes the compliant element, which is deflected to exert a preload that forces the sliding position indicator against a housing of the digital ruler. Alignment features of the position indicator and housing have cross sections that provide a self-aligning angled interference fit, which accurately aligns the sliding position indicator, under the action of the preload force. Misalignment constraint surfaces constrain the sliding position indicator in approximate alignment by, even if an external force overcomes the preload force.

23 Claims, 12 Drawing Sheets

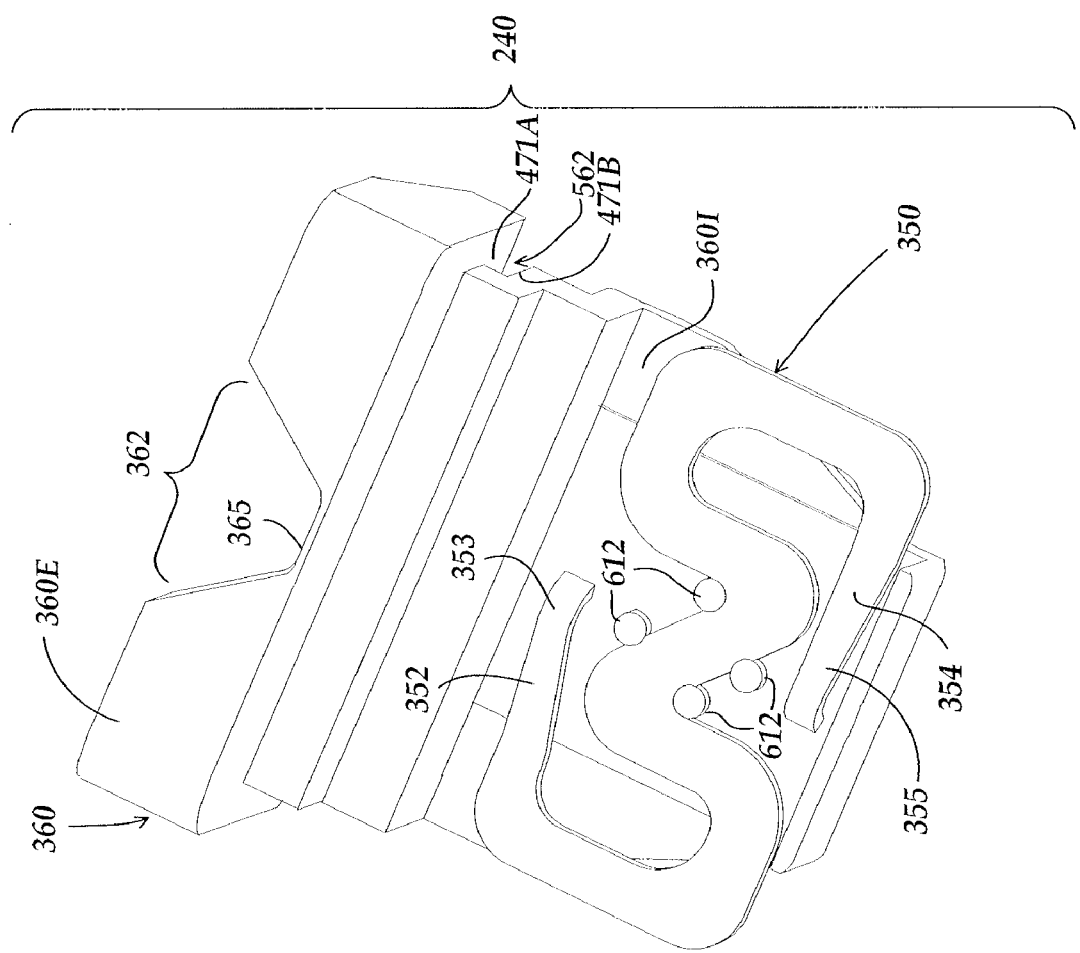
Fig. 6.
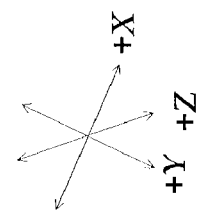

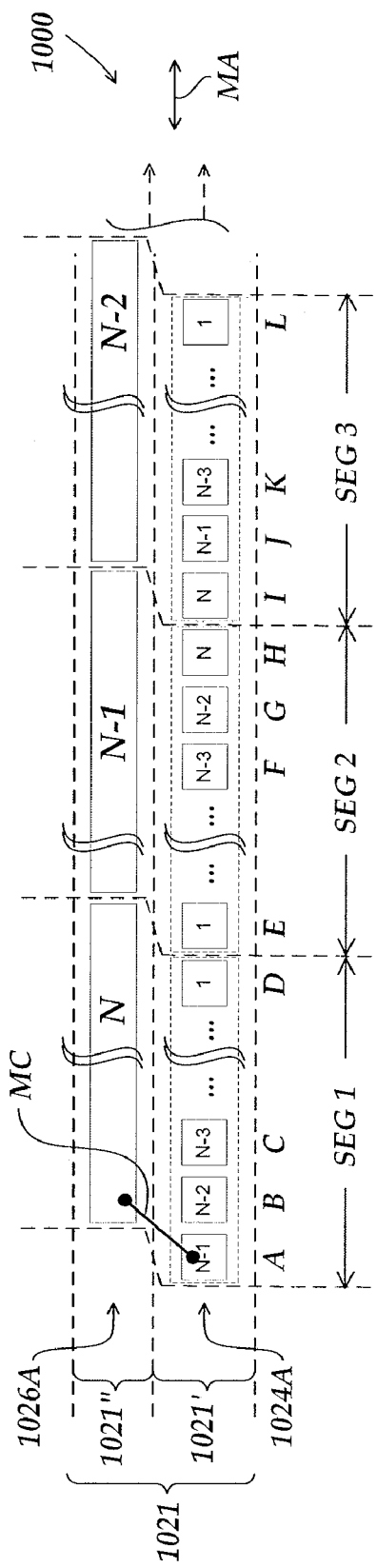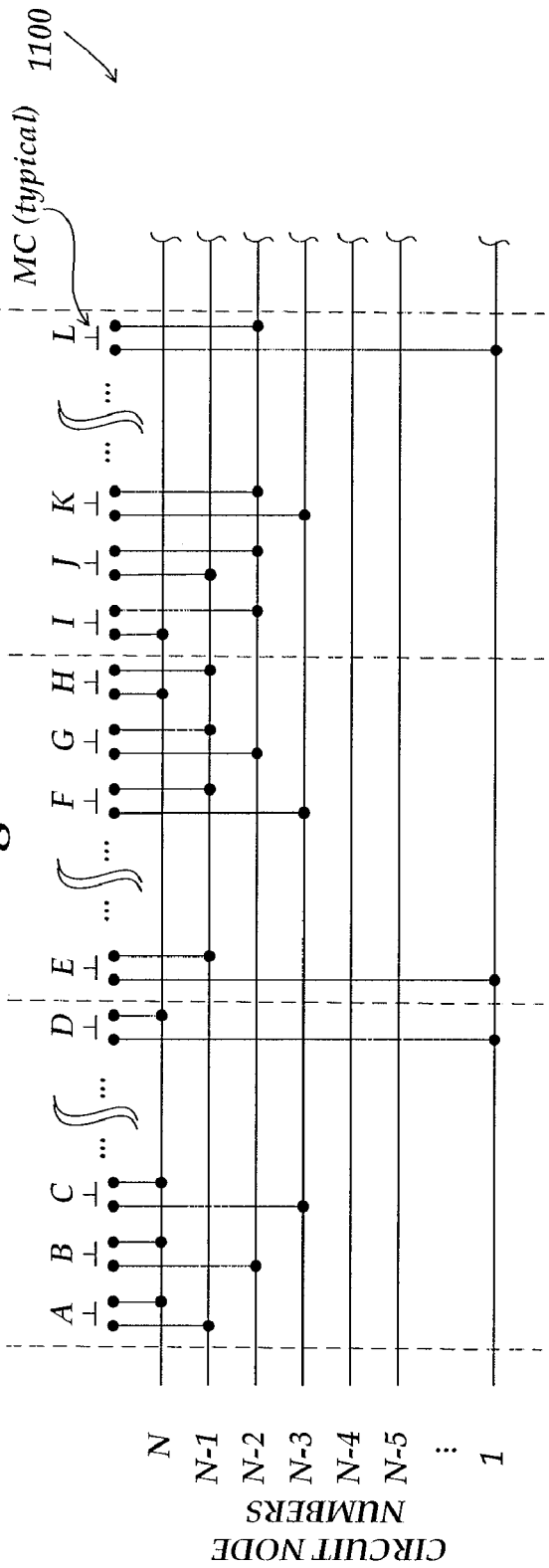
Fig.10.
Fig.11.

DIGITAL RULER WITH LOW-FRICTION SLIDING CONTACT

FIELD OF THE INVENTION

The invention relates generally to metrology systems, and more particularly to electronic digital rulers.

BACKGROUND OF THE INVENTION

Various portable electronic measuring instruments are available. One such instrument is a digital ruler with a sliding position indicator. One example of a digital ruler is described in U.S. Pat. No. 4,974,164, which is directed to a ruler-like measuring and calculating instrument that is capable of registering individual size measurements and displaying numeric results. A slider-mounted pointer is attached to a slider assembly that is received in a track in the upper surface of the device. The slider assembly includes a display and a set of control push-buttons which implement various measuring functions. The pointer points to a ruled scale along the edge, and as the pointer is moved along the scale, the position is sensed and encoded electro-optically from an internal fixed bar-scale and is then provided on the display.

Another digital ruler device is described in U.S. Pat. No. 4,282,571, which discloses an electronic apparatus for measuring, computing, and displaying linear or angular displacements. A slidable cursor selector is received, and moves in, a slot in an upper surface of the device, and points toward a straight edge on the side of the device. A display, keypad and switches for selection of various functions and operating modes are provided. In a measuring mode, an illuminated indicator representing an index is placed at one limit of the line or angle to be measured, and the slidable cursor selector is moved to the other limit of the line or angle. The apparatus then displays the associated angle or distance.

Another digital ruler type device is described in U.S. Pat. No. 4,941,267, which is directed to a method and apparatus for obtaining a distance between points which appear on a scaled drawing. First and second indicators are received in and slide along an elongated tubular opening in the side of the housing of the device to mark the points to be measured. A display and switches are provided for various functions. The indicators are pointed and extend away from the housing to assist with the location of the first and second points on the drawing. The first and second indicators are connected to a conductive arm and a resistance arm, respectively, to provide a potentiometer for generating an analog voltage signal, which corresponds to the distance between the two points. A scaled measurement is provided on the display.

Another measurement device is described in U.S. Patent Pub. No. 2004/0080306, which discloses an apparatus and method for measuring angular or linear displacement. A movable conductive member is displaced to a position at which it electrically contacts a corresponding one of a plurality of fixed contacts, thereby completing a circuit that includes a corresponding memory location in a read-only memory. That memory location indicates the amount of displacement that corresponds to that fixed contact. The corresponding data is transferred to an output device for display or additional processing.

Sliding type variable resistance devices such as those disclosed in U.S. Pat. Nos. 4,101,864; 3,671,915; 5,673,015, and the like, may also have certain features in common with some digital ruler devices. However, the features of sliding type variable resistance devices are generally not compatible with the ergonomic characteristics required for digital rulers.

It would be desirable to provide improved characteristics for a digital ruler, in comparison to the various devices referred to above. For example, improving the level of measurement accuracy while reducing the cost and/or improving the ergonomic characteristics of digital rulers, and especially the frictional characteristics, would be desirable. In particular, previously known devices have not adequately considered problems related to operating such devices using the fragile tip of a pencil, or the like. The present invention is directed to a digital ruler with an improved combination of ergonomic characteristics, low cost, reliability and accuracy.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A digital ruler with a desirable combination of ergonomic characteristics, including very low friction, low cost, reliability and accuracy is disclosed. It is a major goal of this invention to minimize frictional forces associated with moving its sliding position indicator—not only to avoid breaking fragile instrument tips (e.g., pencil points) that may used to move the sliding position indicator, but also to avoid "stiction" effects that may arise when attempting to precisely terminate a line end, or position the sliding position indicator for a measurement. At the same time, it is a goal to avoid sloppy alignment and maintain high accuracy. It is also a goal to provide improved features for coupling an instrument tip to the sliding position indicator in an ergonomic and accurate manner.

In accordance with one aspect of the invention, the digital ruler includes a ruler body assembly having a base plane positionable against a work surface, and a sliding position indicator. The sliding position indicator extends through and moves along a slot in the ruler body assembly and is positionable at a plurality of unique measuring positions along the direction of the measuring axis of the digital ruler. The digital ruler may have external markings for performing standard ruler functions. In various embodiments, the ruler body assembly may comprise a housing comprising a cover portion and first set of X-Y misalignment constraint surfaces that extend along the direction of the measuring axis. It may also comprise a printed circuit board assembly comprising a printed circuit board and a measuring track portion comprising a plurality of measuring scale contacts arranged along a first surface of the printed circuit board to provide a measuring scale contact configuration that extends along the measuring axis. The printed circuit board assembly may also comprise a signal processing and display circuit configured to detect unique sets of measuring scale contacts that are electrically connected to the sliding position indicator depending on its position along the measuring axis, wherein each unique set of electrically connected measuring scale contacts is indicative of a corresponding unique measuring position along the measuring axis. In various exemplary embodiments, the sliding position indicator may comprise an indicator body including a second set of X-Y misalignment constraint surfaces, wherein each member of the second set of X-Y misalignment constraint surfaces is located opposing a proximate member of the first set of X-Y misalignment constraint surfaces. The sliding position indicator may also comprise an indicator contact that comprises a conductive material configured to provide a plurality of conductively connected contact pads and a compliant portion configured to force the contact pads against the measuring scale contacts to connect them to define the unique sets of electrically connected measuring scale contacts.

According to one aspect of the invention, the sliding position indicator generally comprises an instrument receiving feature formed in an external portion of the indicator body that extends outside the ruler body assembly from the slot, wherein the instrument receiving feature is configured to receive an instrument tip that is positioned against the work surface and operably engage with the instrument tip such that the instrument tip moves the sliding position indicator in conjunction with the instrument tip, when the instrument tip is moved along the direction of the measuring axis.

A hypothetical orthogonal coordinate directions may be defined relative to the digital ruler such that an X direction is parallel to the direction of the measuring axis, a Y direction is orthogonal to the X direction and approximately parallel to the base plane, and a Z direction is normal to an X-Y plane that is parallel to the X and Y directions. In terms of these coordinate directions, the first and second sets of X-Y misalignment constraint surfaces are arranged to constrain a maximum misalignment of the sliding position indicator relative to the ruler body assembly for misalignments in the X-Y plane (e.g., yaw misalignment, which is rotation about an axis parallel to the Z direction), as the sliding position indicator is moved along the slot.

The instrument receiving feature may include features which are advantageous for maintaining accurate operation of the digital rule while reducing the need for a high degree of care on the part of a user in order to do so. According to one aspect of the invention, proximate to the instrument receiving feature, a bottom plane of the external portion of the indicator body has a small clearance dimension along the Z direction relative to the base plane. According to another aspect of the invention, the instrument receiving feature may includes an abutting edge that has small dimension along the Z direction where it operably engages the instrument tip, clearance is provided surrounding the top of the abutting edge such that when a side surface of the instrument tip is operably engaged with the abutting edge, that side surface of the instrument tip may be inclined up to at least 30 degrees from the Z direction, at least in an X-Z plane that is parallel to the X and Z directions, without contacting the external portion of the indicator body except at the abutting edge. According to another aspect of the invention, the instrument receiving feature may includes an instrument tip seating portion for operably engaging the instrument tip, wherein the instrument tip seating portion has a small tip-to-edge dimension along the Y direction between the instrument seating portion and an edge of the cover portion that is adjacent to the slot is and that faces the external portion of the of the indicator body. According to a further aspect of the invention, the instrument receiving feature comprises a notch shape and the instrument tip seating portion comprises an apex of the notch shape.

According to other aspects of the invention, in various embodiments, the housing may also comprise an alignment track that extends along the direction of the measuring axis and the sliding position indicator comprises a yaw alignment guide located on an internal portion of the sliding position indicator that extends inside the ruler body assembly from the slot, wherein the yaw alignment guide is located proximate to the alignment track. The sliding position indicator may include preload arrangement located on the interior portion of the sliding position indicator and comprising at least one compliant element associated with the indicator contact. The preload arrangement is configured to provide a preload force component that acts on the indicator body and that is directed along a direction away from the measuring scale contacts and toward the alignment track. The alignment track and the yaw alignment guide are configured with cross sections that form a self-aligning angled interference fit such that, in the absence of an external force acting on the sliding position indicator, the preload force component acting on the indicator body forces the yaw alignment guide to contact the alignment track at an angled contact surface region and at an opposing restraining contact region defined by the self-aligning angled interference fit, and forces the yaw alignment guide to seat against the alignment track such that reaction force components at the angled contact surface region and the opposing restraining contact region force the yaw alignment guide to be repeatably aligned relative to the alignment track and relative to the direction of the measuring axis.

According to a further aspect of the invention, the first and second sets of X-Y misalignment constraint surfaces are configured such that at least one member of the second set of X-Y misalignment constraint surfaces is separated by a gap from its opposing proximate member of the first set of X-Y misalignment constraint surfaces when the yaw alignment guide is seated against, and repeatably aligned relative to, the alignment track. In general, such a configuration helps provide a sliding position indicator with repeatable alignment and low frictional forces.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 is a diagram of an isometric bottom view of the sliding position indicator of FIGS. 5A and 3A;

FIGS. 10 and 11 are diagrams that schematically illustrate one exemplary layout and connection scheme that may be used to implement the first exemplary scale contact configuration of FIG. 3A.

DETAILED DESCRIPTION OF THE PREFERRED EMBODIMENT

Figure 1:
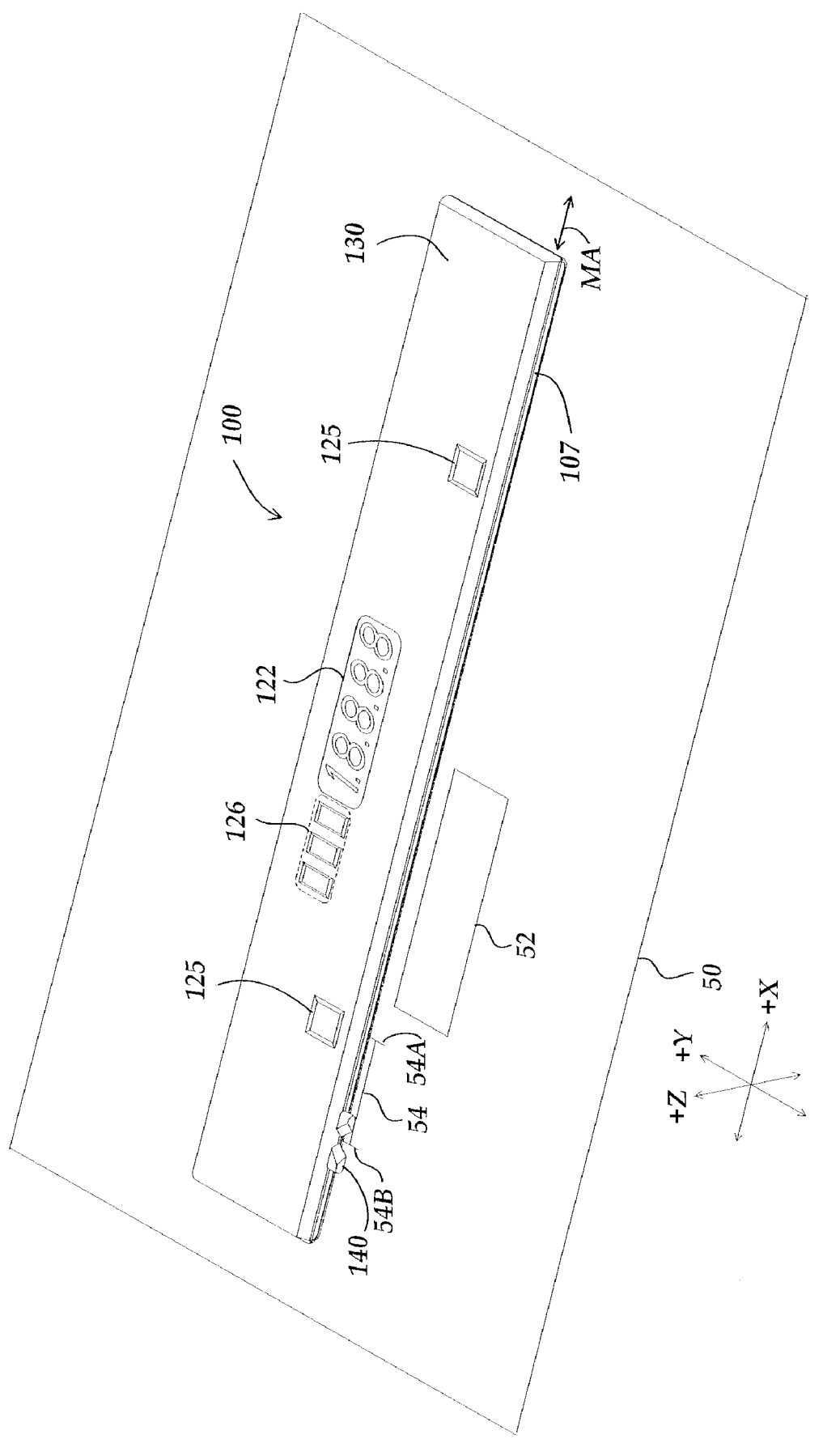
FIG. 1 is a diagram of an isometric view of a digital ruler with a sliding position indicator on a work surface.

FIG. 1 is an isometric view of a digital ruler 100 with a sliding position indicator 140. In FIG. 1, the digital ruler 100 is shown located on a work surface 50 adjacent to a feature 52 to be measured. As will be described in more detail below, in one embodiment a sliding position indicator 140 includes an instrument receiving feature (e.g., a notch feature) for receiving a writing instrument (e.g., a pen or pencil), such that a line 54 may be measured while it is being drawn between a starting point 54A and an end point 54B.

The digital ruler 100 also includes a slot 107, a display portion 122, zero buttons 125, function buttons 126 and a cover portion 130. As will be described in more detail below, the slot 107 in the side of the digital ruler 100 receives the sliding position indicator 140 for sliding along the length of the digital ruler 100. The zero buttons 125 may be utilized to perform a "zeroing" function, by which the current position of the sliding position indicator 140 may be designated as the starting position for performing a measurement. In the embodiment of FIG. 1, the locations of a zero buttons 125 in each half of the digital ruler 100 allows a user to have easy ergonomic access to at least one of the zero buttons 125 regardless of the current orientation of the digital ruler 100 or how it is being held by the user (e.g., if a user is holding the digital ruler 100 at one end while the sliding position indicator 140 and measurements are being taken at the other end, the user will have access to a zero button 125 at the more convenient end.) The function buttons 126 may activate features such as switching the displayed measurements between inch/mm/fractions, or functions such as subtraction/addition/division of two readings, or an automatic zeroing mode after a specified time interval, etc. In various implementations, any one or more of the zero buttons 125 and the function buttons 126 are optional, and may be eliminated. The cover portion 130 may include external measurement markings for performing standard ruler functions.

FIG. 1 also shows orthogonal X, Y and Z axes or directions, including a convention for the positive direction along each axis relative to the digital ruler. These axes or directions are oriented in a consistent manner with respect to the digital ruler and/or its parts, throughout the figures described herein. The X direction is parallel to a measuring axis direction MA shown in FIG. 1, with the +X direction to the right when facing the edge with the slot 107. The Y direction is orthogonal to the X direction and approximately parallel to a ruler body assembly base plane that is positionable against the work surface 50, and/or a surface plane of a measuring track 221 and/or a printed circuit board 225, which are shown and described in greater detail below with reference to FIGS. 2 and 3. The +Y direction may point toward the core of the ruler from the edge with the slot 107. The Z direction is normal to the X-Y plane and the +Z direction is established in relation to the +X and +Y directions according to the right hand rule.

Figure 2:
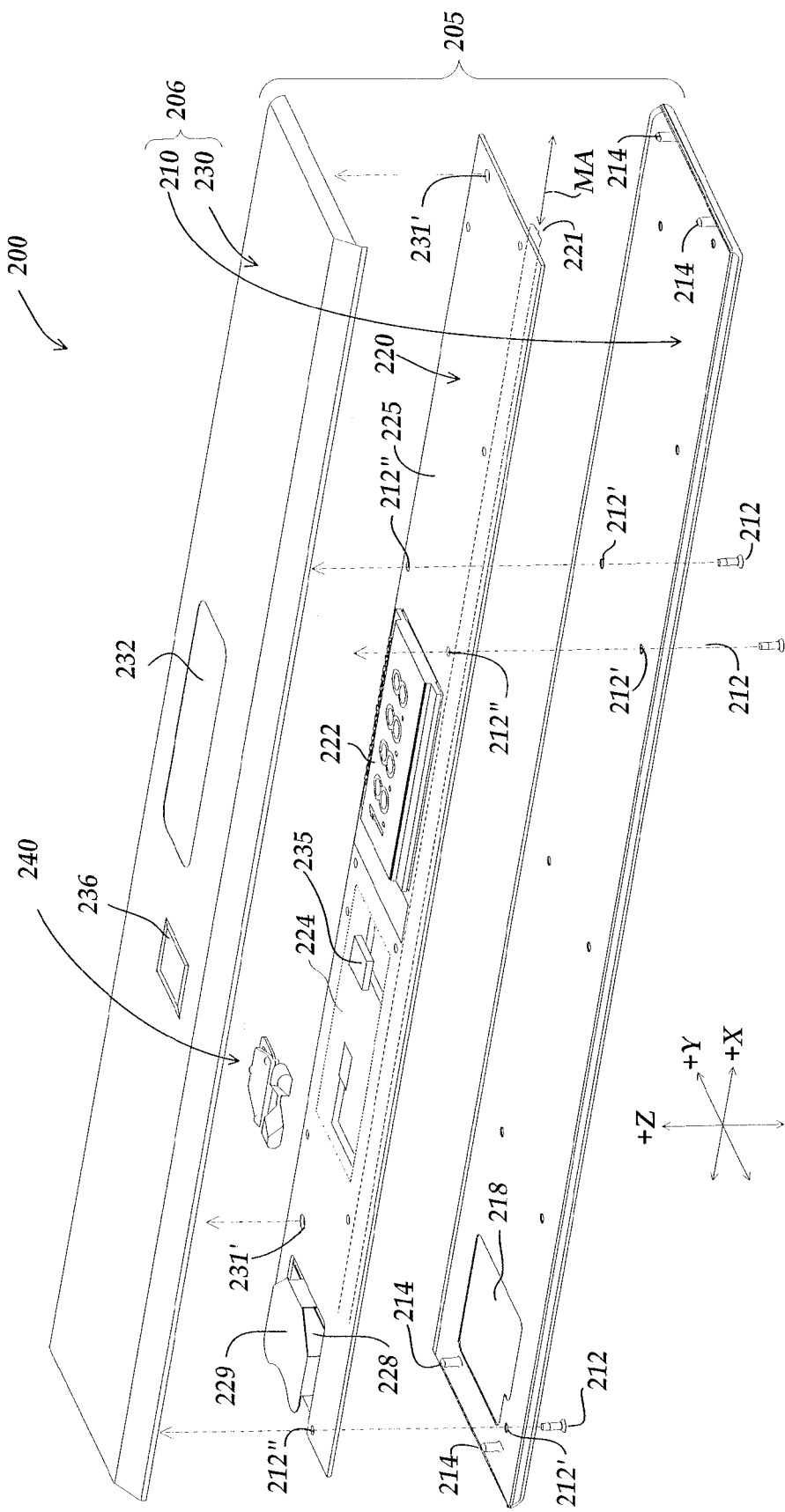
FIG. 2 is a diagram of a partly exploded isometric view of a digital ruler with a sliding position indicator.
Figure 3:
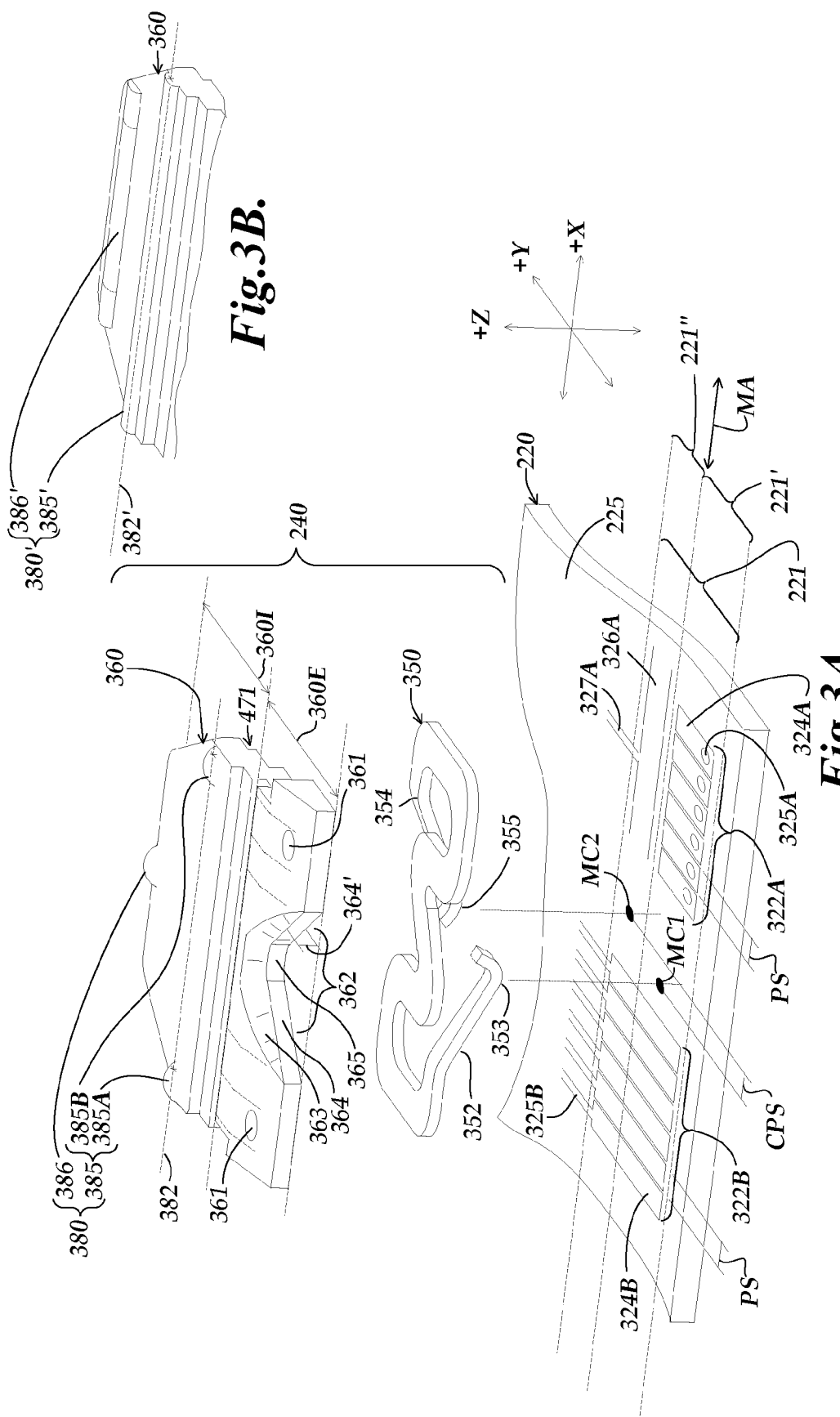
FIG. 3A is a diagram of an exploded isometric view of the sliding position indicator of FIG. 2 including a first exemplary alignment runner configuration and a first exemplary preload arrangement, and portions of first and second exemplary embodiments of corresponding scale contact configurations.
FIG. 3B is a diagram of a second exemplary alignment runner configuration usable in place of the first exemplary alignment runner configuration of FIG. 3A.

FIG. 2 is a diagram of a partly exploded isometric view of a digital ruler 200. It will be appreciated that the components of the digital ruler 200 are generally similar to those of the digital ruler 100 of FIG. 1, except as otherwise described below. As shown in FIG. 2, the digital ruler 200 includes a ruler body assembly 205 and a sliding position indicator 240. The ruler body assembly 205 includes a housing 206 which comprises a cover portion 230, and in the embodiment shown in FIG. 1 also comprises a molded bottom portion, which together encase a printed circuit board assembly 220. When assembled, the molded bottom portion 210 is fixed to the cover portion 230 by screws 212 which pass through holes 212' and 212" in the molded bottom portion 210 and printed circuit board assembly 220, respectively, and are received in corresponding threaded portions (not shown) of the cover portion 230. It will be understood that more screws 212 may be used than the three representative instances shown in FIG. 2, and that in other embodiments assembly may be accomplished without any screws or other discrete fasteners, by using adhesives or molded "snap fittings", or the like. The molded bottom portion 210 may also include posts 214 which assist with the attachment and alignment to the cover portion 230. A plurality of alignment holes 231' may be included in the printed circuit board assembly 220 for receiving an alignment post (not shown) in the cover portion 230, for precisely aligning the printed circuit board assembly 220 relative to the cover portion 230. When assembled, in one embodiment the sliding position indicator 240 is received in and moves along a slot (e.g., slot 107 of FIG. 1) between the molded bottom portion 210 and the cover portion 230. As illustrated in FIG. 2, in one embodiment the cover portion 230 may be thicker than the molded bottom portion 210. Having one of either the molded bottom portion 210 or the cover portion 230 be thicker than the other in certain implementations may provide for a greater overall stiffness of the digital ruler 200 when assembled.

The printed circuit board assembly 220 may include a printed circuit board 225, a display portion 222, electronic circuitry 224 (symbolically represented in FIG. 2), a battery 228 and a measuring track 221. As will be described in more detail below with respect to FIG. 3A, the measuring track 221 includes electrical scale contacts, which may be fabricated on the printed circuit board 225, for use in conjunction with the sliding position indicator 240. As shown in FIG. 2, the display portion 222 is visible through a window 232 in the cover portion 230 and may comprise a standard electronic digital display (e.g., an LCD.) The electronic circuitry 224 may include certain signal processing and display circuitry (e.g. a custom ASIC or a micro controller for controlling elements such as the display portion 222 and receiving and processing signals governed by the measuring track 221.) In one embodiment the electronic circuitry 224 may include an orientation sensor (e.g., an accelerometer) and the digits in the display portion 222 may be automatically inverted, depending on a signal from the orientation sensor. The battery 228 provides power for the digital ruler 200. In the embodiment shown in FIG. 2, the battery 228 is constrained in a battery housing 229 and extends through a cutout in the printed circuit board 225 such that the printed circuit board 225 is located within a span of the thinnest dimension of the battery. When assembled, the battery is seated above a battery clearance area 218 in the molded bottom portion 210. The foregoing battery configuration allows the overall thickness of the digital ruler 200 to be minimized. A switch 235 may provide signals controlled by a multi-purpose button 236 located in the cover portion 230, which in one embodiment may provide functionality such as a zeroing function and/or other functions such as those described above with reference to the function buttons 126 of FIG. 1.

In one embodiment, a zero switch and/or its actuator may be provided that moves with the sliding position indicator 240. In another embodiment, a zero switch may be provided that comprises a vibration or acoustic sensor (e.g., a piezoelectric film sensor) located in the housing 206 (e.g., on the printed circuit board assembly 220) to sense the user "tapping" on the housing and activate the zero switch. In another embodiment, a zero pointer may be provided which is moveable and which designates the zero reference position, in which case the zero pointer may be locked, or otherwise made less easy to move than the sliding position indicator, so that it will remain in place while measurements are being performed. In another embodiment, an ergonomic zero switch may be provided that has a protective ridge surrounding the switch, so that the user may grip the digital ruler in the location of the switch, but not activate the switch in that it takes a special angular approach or pressure for a user's finger to activate it.

In another embodiment, a zeroing mode may be activated by performing a predefined sliding position indicator motion sequence without requiring the utilization of a zero switch. As one example of a predefined sliding position indicator motion sequence for activating a zeroing mode, in one implementation after the user moves the sliding position indicator 240 to a starting location, the display 222 may initially indicate the location of the sliding position indicator 240 relative to zero. After a predetermined period of time, the display 222 may automatically reset to indicate the current location of the sliding position indicator 240 as the zero position. In one implementation, if the sliding position indicator 240 is not moved for an even further extended period of time, the digital ruler 200 may go into a sleep mood for power savings. Once the display 222 registers the current location of the sliding position indicator 240 as zero, the user may move the sliding position indicator 240 to a second desired location (e.g., utilizing a writing instrument such as a pen or pencil to draw a line that is measured while it is being drawn.) The display 222 then indicates the distance the sliding position indicator 240 has been moved (e.g., the length of the line.)

As another example of a predefined sliding position indicator sequence that may be utilized for activating either a zeroing mode or other selected functions, in one embodiment dedicated function marks may be included at the end of the cover portion 230, and the sliding position indicator 240 can be moved to their location to contact corresponding internal contacts and activate the corresponding function. In such an embodiment, the display 222 then shows a symbol to indicate the function that is activated. In some embodiments, the ruler may go into a low power mode when the sliding position indicator 240 is stationary for a predefined amount of time, and automatically resume normal operation when the sliding position indicator 240 is moved.

In one embodiment, the digital ruler 200 may include additional fold-out or other accessories for performing other measurement functions. In one embodiment, low cost (e.g., molded) snap-in accessories may be retained in or on the surface of the housing 206 (e.g., cross hairs, handles, etc.) Certain accessories may be hinged to the housing 206 (e.g., a flip-out foot for performing caliper type operations in combination with the sliding position indicator 240.) In another embodiment, a rod may be retained in a storage cylinder in the housing 206, and removed and snapped into an engaging feature of the sliding position indicator 240, in order to perform depth gauge type operations relative to an end of the ruler. In another embodiment, the sliding position indicator 240 may have a portion or a snap-in accessory that extends from the housing 206 for a sufficient distance so as to be able to engage a 3D workpiece and perform height gauge type operations with the ruler standing on end.

FIG. 3A is a diagram of an exploded isometric view of the sliding position indicator 240 of FIG. 2 including a first exemplary alignment runner configuration 380 and a first exemplary preload arrangement comprising a compliant element included in an indicator contact 350. FIG. 3A also illustrates portions of first and second alternative scale contact configurations 322A and 322B. It will be appreciated that in an actual embodiment only one of the two exemplary scale contact configurations 322A or 322B may be required, and that either configuration would extend along the measuring axis MA for the entire measuring range of the digital ruler. Only a short segment of each configuration is shown in FIG. 3A.

As shown in FIG. 3A, the sliding position indicator 240 includes the indicator contact 350 affixed to an indicator body 360. The indicator contact 350 is electrically conducting, and includes spring legs 352 and 354 with respective contact pads 353 and 355. As will be described in more detail below, the spring legs 352 and 354 may act as a compliant portion for determining the force with which contact is made between the measuring track portion 221 and the contact pads 353 and 355, and also as a compliant element in a preload arrangement configured to force or bias the indicator body 360 against alignment features of the housing 206 and thus into a proper alignment relative to the ruler body assembly 205. In an alternative preload arrangement, a separate compliant element may act in combination with any compliant elements of the indicator contact 350 to provide a desired total preload force, as will be described in more detail below with respect to FIGS. 7A and 8.

The contact pads 353 and 355 of the indicator contact 350 make contact with the measuring track portion 221 at measuring contact points MC1 and MC2, respectively. In operation, as the sliding position indicator 240 is moved along the measuring axis direction MA, the measuring contact point MC1 moves along the first measuring subtrack portion 221', while the measuring contact point MC2 moves along the second measuring subtrack portion 221". The measuring contact points MC1 and MC2 are spaced apart along the measuring axis direction MA by a contact point spacing CPS. In one embodiment, the contact point spacing CPS is set to be approximately the same as a scale contact pitch PS (e.g., the pitch PS of the scale contacts 322B or 322A.) As the indicator contact 350 is moved along the measuring track portion 221, at each measuring position the indicator contact 350 connects together the combination of scale contacts located at the measuring contact points MC1 and MC2, and the signal processing circuitry may identify the particular combination scale contacts that are shorted, and determine the measuring position of the sliding position indicator 240 accordingly.

As a first example, the first scale contact configuration 322A includes a set of individual scale contacts 324A arranged along the first measuring subtrack portion 221' at a scale contact pitch PS (e.g., one millimeter), and a scale contact 326A that may extends along a segment, or all, of the second measuring track portion 221" in various embodiments. The scale contacts 324A are coupled through electrical feedthroughs 325A to the other side of the printed circuit board assembly 220, and then to the signal processing circuitry of the digital ruler. The elongated scale contact 326A is similarly coupled through a circuit trace 327A. As the indicator contact 350 is moved along the measuring track portion 221, at each measuring position the indicator contact 350 connects the scale contact 326A to a unique one of the scale contacts 324A, and the signal processing circuitry identifies the corresponding unique position. Implementation of the scale contact configuration 322A will be described in more detail below with respect to FIGS. 10 and 11.

As a second example, the second scale contact configuration 322B includes a set of individual scale contacts 324B that extend across both the first and second measuring subtrack portions 221' and 221", and that are arranged along the measuring axis direction MA at a scale contact pitch PS (e.g., one millimeter). The scale contacts 324B are coupled by circuit traces 325B to the processing circuitry of the digital ruler. Since the contact point spacing CPS is set to be approximately the same as a scale contact pitch PS, as the indicator contact 350 is moved along the measuring track portion 221, at each measuring position the indicator contact 350 connects a unique adjacent pair of the scale contacts 324B, and the signal processing circuitry identifies the corresponding unique position. Implementation of the scale contact configuration 322B will be described in more detail below with respect to FIG. 12.

The indicator body 360 includes an external portion 360E that extends outside the ruler body assembly 205 from the slot 107 and an internal portion 360I that extends inside the ruler body assembly 205 from the slot 107. The external portion 360E includes "non-marking" instrument tip holes 361, and an instrument receiving feature 362. The non-marking instrument tip holes 361 (which may or may not be through holes) may be utilized for moving the sliding position indicator 240 with a writing instrument (e.g., a pen or pencil) without marking on a work surface. The instrument receiving feature 362 may be a notch feature (e.g., a V-shaped feature, or narrow U-shaped feature, or a similar fork shape), and may be designed to receive and operably engage the tip of a writing instrument at a narrow instrument tip seating portion 365 at its apex, and thereby precisely and repeatably center itself relative to the instrument tip. In some embodiments, a small hole or semicircle may provide an instrument receiving feature. The instrument receiving feature 362 is formed in the external portion 360E of the indicator body that extends outside a ruler body assembly from a slot, and the instrument receiving feature 362 is configured to receive an instrument tip that is positioned against the work surface 50 and operably engage with the instrument tip such that the instrument tip moves the sliding position indicator 240 in conjunction with the instrument tip, when the instrument tip is moved along the direction of the measuring axis (e.g., when a writing instrument tip is used to draw a line on a work surface, such that the length of the line may be precisely measured while it is being drawn). Alternatively, a writing instrument or non-marking stylus tip can be similarly operably engaged in the instrument receiving feature 362, such that when the tip is precisely positioned at a point on the work surface (e.g., a feature edge) the sliding position indicator 240 will be precisely and repeatably positioned at a corresponding measurement position.

A number of aspects of the instrument receiving feature 362 may contribute to robust and accurate use. For example, in some implementations it is desirable that the bottom plane of the external portion 360E of the indicator body proximate to the instrument receiving feature 362 be very close to the ruler body assembly base plane that is positioned against a work surface (e.g., to provide a clearance dimension along the Z direction, as shown in greater detail in FIG. 5A, that is at most 2.0 mm in some embodiments, or more advantageously at most 1.5 mm, or less, in various other embodiments). Also, it is advantageous in various embodiments that the instrument receiving feature 362 includes an abutting edge 364 for operably engaging the instrument tip, wherein the abutting edge has thickness dimension 364' along the Z direction that is limited (e.g., to at most 2.0 mm, for example). In the embodiment shown in FIG. 3A, the external portion 360E of the indicator body 360 proximate to the instrument receiving feature 362 is configured with a bevel 363 to limit the thickness dimension 364' and provide clearance surrounding the top of the abutting edge 364 such that when a side surface of the instrument tip is operably engaged with the abutting edge 364, that side surface of the instrument tip may be inclined (e.g., up to at least 30 degrees from the Z direction, at least in an X-Z plane that is parallel to the X and Z directions), without contacting the external portion 360E of the indicator body 360, except at the abutting edge 364. Such a configuration tends to minimize any variation in the position of the sliding position indicator 240 which might otherwise occur relative to the tip of a instrument or stylus, when the tip of a writing instrument or stylus is fixed to an underlying work surface (e.g., a piece of paper) but the orientation of the writing instrument or stylus is changed.

In addition, in some implementations it is desirable that the instrument tip seating portion 365, which should generally be that portion of the instrument receiving feature 362 that is closest along the Y direction to an edge of the cover portion that is adjacent to the slot that the sliding position indicator 240 moves along and that faces the external portion 360E of the of the indicator body, is configured to provide a small tip-to-edge dimension or distance (e.g., at most 3.0 mm, or more advantageously at most 1.5 mm or less, if practical in various embodiments) from a surface or abutting edge of the instrument tip seating portion 365 to the cover edge that faces the external portion 360E (as shown in greater detail in FIG. 5A). This may provide various advantages. A first advantage is that this may minimize the distance from the instrument tip seating portion 365 along the Y direction to the measuring contact points MC1 and MC2 of the indicator contact 350 in some embodiments. Such a configuration tends to minimize the change in the measuring position of the measuring contact points MC1 and MC2 relative to the instrument tip seating portion 365 and the instrument tip, in the case that the sliding position indicator 240 rotates by a given amount of yaw misalignment about the z-axis in an X-Y plane (e.g., due to external forces and/or frictional forces). A second advantage is that as an instrument tip exerts an external force on the sliding position indicator 240 along the X direction proximate to the instrument tip seating portion 365 (e.g., in order to draw a line or to position it along the measuring axis MA), the moment arm along the Y direction between that X direction external force and any X direction frictional forces acting on the internal portions of sliding position indicator 240 will be minimized (e.g., friction associated with the measuring contact points MC1 and MC2). As a result, any resulting moments tending to induce yaw misalignment of the sliding position indicator 240 about the z-axis in an X-Y plane will be minimized, which may also minimize associated reaction forces, friction, and bearing surface wear. Another advantage is that there is a natural tendency to use an edge of a ruler as a reference for aligning the ruler to features or locations on an underlying work surface. Thus, it is ergonomically favorable for the instrument tip seating portion 365 to be close to an edge of the ruler, so that it is inherently aligned at the expected location for measurement or drawing, according to the natural tendencies of a user.

Related to the second advantage, it should be appreciated that it is a major goal of this invention to minimize frictional forces associated with moving the sliding position indicator 240—not only to avoid breaking fragile instrument tips (e.g., pencil points) that may used to move the sliding position indicator 240, but also to avoid "stiction" effects that may arise when attempting to precisely terminate a line end, or simply position the sliding position indicator 240 for a measurement. The inventors have found that even modest increases in friction and/or yaw misalignment rotations above a practical minimum leads to difficulty in precisely positioning the sliding position indicator 240 (e.g., due to hysteretic undershooting and overshooting with the instrument tip, due to the elasticity inherent in gripping and pushing a writing instrument with pliable fingertips). This is particularly true when attempting to use a light touch with a writing instrument or stylus.

It will be appreciated that the various advantageous aspects of the instrument receiving features 362 outlined above may be used separately in various embodiments, and some advantages will be retained. However, the various aspects outlined above are particularly advantageous when used in combination in an instrument receiving feature.

The internal portion 360I of the indicator body 360 shown in FIG. 3A includes an alignment runner configuration 380 which includes a yaw alignment guide 385 comprising alignment guide bumps 385A and 385B that are spaced apart along a yaw alignment guide axis 382, and a roll guide 386 comprising another bump on the top of the indicator body 360. The alignment runner configuration 380 is biased against corresponding alignment tracks in the ruler housing by a preload force component generated by the preload arrangement of the sliding position indicator 240 (e.g., by the spring legs 352 and 354 of the indicator contact 350, in this embodiment), to help insure proper alignment of the sliding position indicator 240, as described in more detail below with respect to FIGS. 4 and 5A. The indicator body 360 also includes X-Y misalignment constraint surfaces 471, formed along planes parallel to the measuring axis direction MA, which may engage corresponding surfaces of the ruler housing during movement, to limit or constrain yaw misalignment of the sliding position indicator 240, or translational misalignment along the Y direction in an X-Y plane, as described in more detail below with respect to FIGS. 4 and 5A.

FIG. 3B is a diagram of a second exemplary alignment runner configuration 380', usable in place of the first exemplary alignment runner configuration 380 of FIG. 3A. The alignment runner configuration 380' includes a yaw alignment guide 385' that comprises a runner that extends along a yaw alignment guide axis 382', and a roll guide 386' comprising another runner on the top of the indicator body 360.

Figure 4:
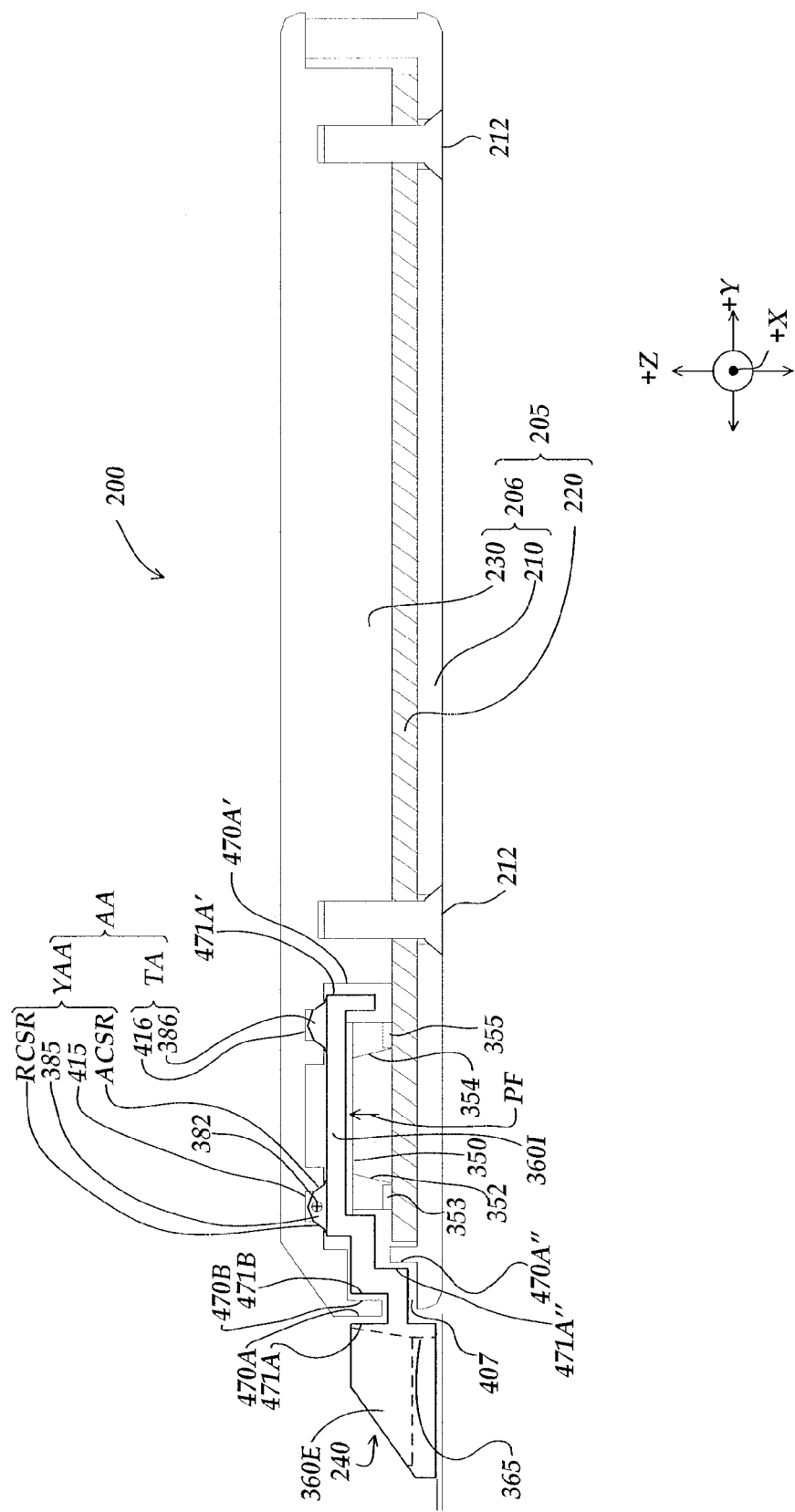
FIG. 4 is a diagram of a cross-section of an end view of a digital ruler having a first exemplary self-aligning yaw alignment arrangement, and including the sliding position indicator of FIG. 3A.

FIG. 4 is a diagram of a cross section of an end view of the digital ruler 200 emphasizing a region surrounding the sliding position indicator 240 of FIG. 3A, and including an alignment arrangement AA comprising a first exemplary self-aligning yaw alignment arrangement YAA, a track arrangement TA, and a first exemplary preload arrangement. The first exemplary self-aligning yaw alignment arrangement YAA comprises an alignment track 415 that extends along the direction of the measuring axis in the cover portion 230 and the yaw alignment guide 385, which slides along the alignment track 415 on an angled contact surface region ACSR and an opposing restraining contact surface region RCSR, as shown. The track arrangement TA shown in FIG. 4 comprises a track 416 in the cover portion 230 and the roll guide 386, which slides along the track 416. As shown in FIG. 4, the sliding position indicator 240 extends through a slot 407 between the molded bottom portion 210 and the cover portion 230, which encase the printed circuit board assembly 220, and which are assembled with screws 212. The sliding position indicator 240 includes the indicator contact 350 attached to the internal portion 360I of the indicator body 360. The contact pads 353 and 355 of the respective spring legs 352 and 354 of the indicator contact 350 are shown to extend downward to contact the printed circuit board assembly 220 in the area of the measuring track portion. The spring legs 352 and 354 are also shown to be deflected to provide a preload force PF that bias or preload the indicator body 360 upwards and preloads the yaw alignment guide 385 against the alignment track 415, as will be described in more detail below with respect to FIG. 5A.

As also shown in FIG. 4, the digital ruler 200 is configured such that a first set of X-Y misalignment constraint surfaces 470 (e.g., 470A and 470B) are provided by elements of the ruler body assembly 205, and a second set of X-Y misalignment constraint surfaces 471 (e.g., 471A and 471B) are provided by the indicator body 360 such that each member of the of second set of X-Y misalignment constraint surfaces 471 is located opposing a proximate member of the first set of X-Y misalignment constraint surfaces 470. The X-Y misalignment constraint surfaces 471 and 470 are described in more detail below with respect to FIG. 5A.

FIG. 5A is a diagram of a cross section of an enlarged end view of the region surrounding the sliding position indicator 240 of FIG. 4, and including the first exemplary self-aligning yaw alignment arrangement YAA and the first preload arrangement comprising the compliant spring legs 352 and 354 of the indicator contact 350. As shown in FIG. 5A, a designed amount of compression of the spring legs 352 and 354 provides a controlled preload force PF that is directed away from the measuring scale contacts located on the printed circuit board assembly 220 and toward the alignment track 415 (and the track 416) in the cover portion 230, which causes the yaw alignment guide 385 to seat into the alignment track 415 and self-align with it, and also causes the roll guide 386 to contact the track 416. This provides precise and repeatable alignment of the sliding position indicator 240 relative to the housing 206, when external forces acting on the sliding position indicator 240 are minimal or absent. This state, wherein the preload force PF is substantially unopposed by external forces, typically occurs during a stationary mode of operation of the digital ruler 200, when no external force is applied to move on the sliding position indicator 240 In this state, the self-aligning yaw alignment arrangement YAA operates at follows. At least one of the yaw alignment guide 385 and the alignment track 415 include an angled contact surface region ACSR, as shown. The preload force PF forces the yaw alignment guide 385 along the +Z direction, to contact the alignment track 415 and slide in the Y-Z plane against the angled contact surface region ACSR. The angled contact surface region ACSR gives rise to a reaction force having a reaction force component RFC1 that forces the yaw alignment guide 385 along the Y direction until it contacts the opposing restraining contact region RCSR, which provides a balancing reaction force component. At that point, the self-alignment is complete, and the yaw alignment guide axis 382 is nominally parallel to the measuring axis MA. It will be appreciated that the yaw alignment guide 385 and the alignment track 415 are configured with cross sections that form a self-aligning "tapered interference fit", also referred to as a self-aligning "angled interference fit", that provides and defines the angled contact surface region ACSR and the opposing restraining contact region RCSR and their relationship, which insures that the yaw alignment guide 385 must simultaneously contact the two opposing surfaces (e.g., the regions ACSR and RCSR) of the alignment track 415, which insures the resulting self-alignment. Thus, the self-aligning angled interference fit of the cross sections of the alignment track 415 and the yaw alignment guide 385 insures that the yaw alignment guide 385 (and the sliding position indicator 240) are repeatably aligned relative to the alignment tack 415 and relative to the direction of the measuring axis MA, under the influence of the preload force component PF.

As also shown in FIG. 5A, the digital ruler 200 is configured such that a first set of X-Y misalignment constraint surfaces 470 (e.g., 470A, 470B, 470A' and/or 470A") are provided by elements of the ruler body assembly 205, and a second set of X-Y misalignment constraint surfaces 471 (e.g., 471A, 471B, 471A' and/or 471A") are provided by the indicator body 360. In particular, each member of the set of surfaces 471 is arranged opposing a proximate member of the set of surfaces 470, such that when the sliding position indicator 240 becomes misaligned due to external forces at least some of the X-Y misalignment constraint surfaces 471 engage their proximate opposing X-Y misalignment constraint surfaces 470 to constrain or limit that misalignment in an X-Y plane. This maintains reasonably good alignment of the sliding position indicator 240 relative to the housing 206 when external forces (e.g., forces applied by a writing instrument to move the sliding position indicator 240) are sufficient to overcome the previously described controlled preload force PF. This state, wherein the preload force PF is opposed and partially or wholly overcome due to external forces acting on the sliding position indicator 240, may occur during a moving mode of operation of the digital ruler 200, when an external force is applied to move the sliding position indicator 240. In this state, reactions forces due to the external forces (e.g., at the angled contact surface region ACSR) may tend to force the yaw alignment guide 385 out of the alignment track 415. However, the first and second sets of X-Y misalignment constraint surfaces 470 and 471 may be configured to insure that the yaw alignment guide 385 is never forced completely out of the alignment track 415. Stated another way, the first and second sets of X-Y misalignment constraint surfaces 470 and 471 may be configured constrain the maximum X-Y misalignment of the sliding position indicator 240 so as to maintain the yaw alignment guide 385 in positions that are always at least partially aligned with the alignment track 415 along the Y direction. Maintaining at least partial alignment in this way insures that the self-aligning angled interference fit of the cross sections of the alignment track and the yaw alignment guide is automatically reestablished when any external force that has overcome the preload force component PF is removed. Thus, the self-aligning angled interference fit may then reestablish repeatable alignment of the yaw alignment guide 385 (and the sliding position indicator 240) relative to the alignment tack 415, as outlined previously. This design principle is used in all the embodiments shown herein.

To maintain at least partial alignment of a yaw alignment guide and an alignment track, in some embodiments the gaps between opposing X-Y misalignment constraint surfaces 470 and 471 along the Y direction may be designed to be less, and in some embodiments significantly less, than a dimension along the Y direction over which the yaw alignment guide 385 may contact the alignment track 415 at an angled contact surface region ACSR. For example, the gaps between opposing X-Y misalignment constraint surfaces 470 and 471 along the Y direction may be designed to be approximately on the order of 0.005-0.020 inches in various low-cost embodiments, although such a range is exemplary only, and not limiting). In some embodiments, it may be desirable that the individual X-Y misalignment constraint surfaces 470 that provide misalignment constraint for motion parallel in an X-Y plane are formed in a single one of the molded bottom portion 210 or the cover portion 230. In such a case the relationships between all such X-Y misalignment constraint surfaces are economically controlled by molding tolerances, rather than by less controllable assembly tolerances that involve multiple parts.

Figure 5:
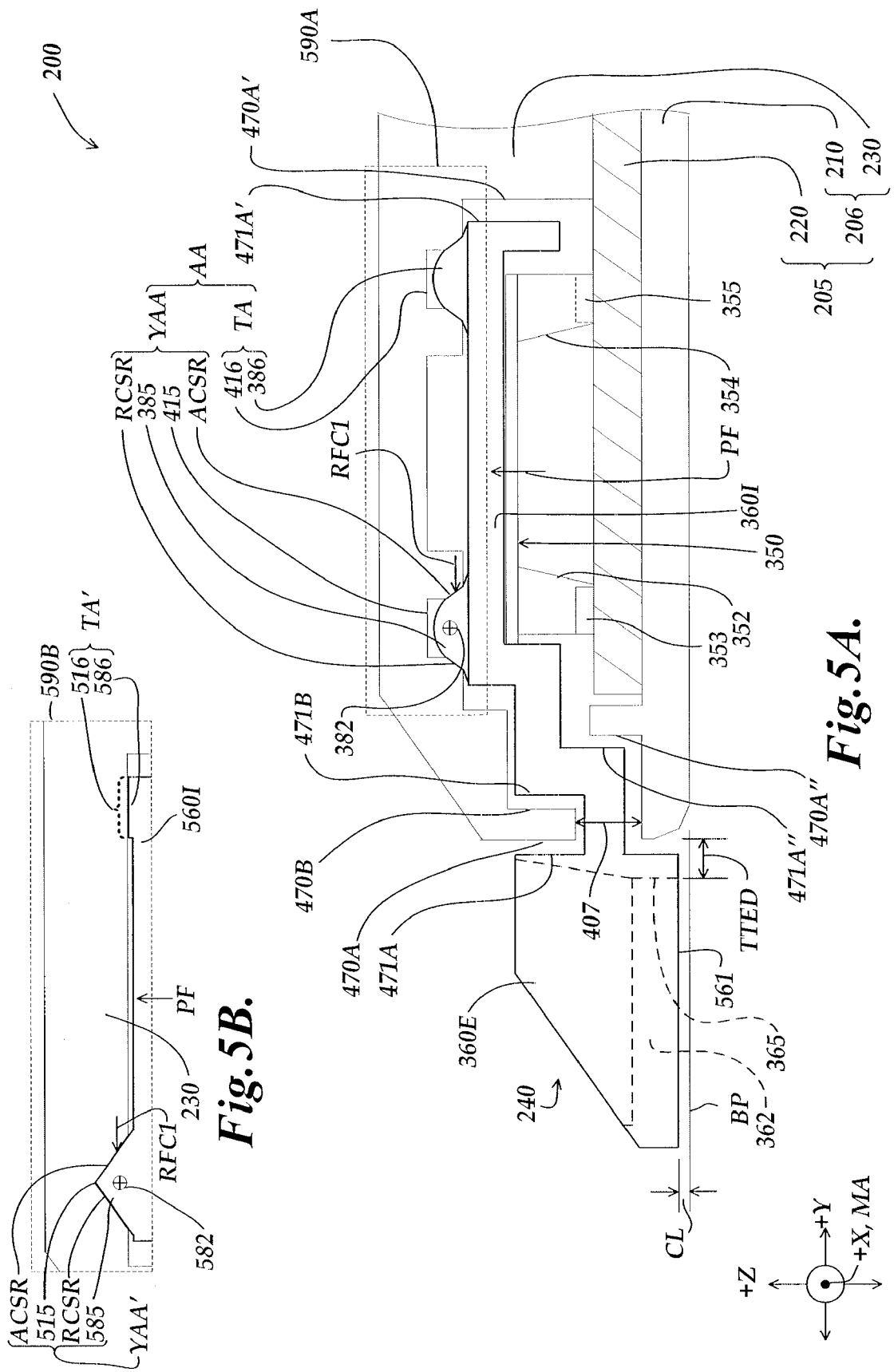
FIG. 5A is a diagram of a cross-section of an enlarged end view of a region surrounding the sliding position indicator region of FIG. 4, and including the first exemplary self-aligning yaw alignment arrangement.
FIG. 5B is a diagram including a second exemplary self-aligning yaw alignment arrangement usable in place of the first exemplary self-aligning yaw alignment arrangement of FIG. 5A.

It will be appreciated that for the configuration of X-Y misalignment constraint surfaces 470 and 471 shown in FIGS. 4 and 5, none of the surfaces of the alignment track 415 and the yaw alignment guide 385 are included in the X-Y misalignment constraint surfaces, and each surface of the set of X-Y misalignment constraint surfaces 471 is separated by a gap from its opposing proximate surface of the set of X-Y misalignment constraint surfaces 470 when the yaw alignment guide 385 is seated against, and repeatably aligned relative to, the alignment track 415. In general, such a configuration helps provide a sliding position indicator with repeatable alignment and low frictional forces. Some of the X-Y misalignment constraint surfaces 470 and 471 in FIGS. 4 and 5 are illustrated to show alternative means of providing such constraint surfaces. It will be appreciated that redundant constraints may be eliminated. It will be appreciated that the configuration of X-Y misalignment constraint surfaces 470 and 471 shown in FIGS. 4 and 5 is illustrative only, and not limiting. Alternative configurations of X-Y misalignment constraint surfaces are disclosed in figures described below. More generally, any X-Y misalignment constraint surface configuration that constrains the indicator body 360 and/or the sliding position indicator according to the principles outlined herein may be used.

It should be appreciated that a digital ruler 200 as outlined above is configured to provide a number features that are desirable separately, and that are unprecedented in combination. Extremely low preload force PF may be used, to provide low friction forces and low wear. Nevertheless, during the moving mode of operation, the X-Y misalignment constraint surfaces 470 and 471 insure that the indicated position is approximately accurate (e.g., within 1-2 mm or less), and that wear on critical sliding surfaces (e.g., contact surfaces) is controlled or minimized. During the stationary mode of operation, the self-aligning yaw alignment arrangement YAA insures that the indicated position is quite accurate (e.g., within 0.5 mm or less). During a transition from the moving mode to the stationary mode of operation, such as during a small or final adjustment to the position of the sliding position indicator 240, the higher frictional forces that may be generated due to misalignment during the moving mode relax, such that only the minimal friction associated with the controlled preload force PF must be overcome to move the sliding position indicator 240 as the motion diminishes. Importantly, this minimizes "stiction" such that the sliding position indicator 240 can be smoothly and precisely positioned.

As further illustrated in FIG. 5A, a bottom plane 561 of the external portion 360E of the indicator body 360 is shown to have a minimal clearance dimension CL above the base plane BP of the ruler body assembly 205. As previously indicated, in various implementations it is desirable that the bottom plane 561 of the external portion 360E of the indicator body 360 proximate to the instrument receiving feature 362 be very close to the base plane BP and the work surface that it rests on, so as to minimize variations in the position of the sliding position indicator 240 which might otherwise occur relative to the tip of a writing instrument or stylus, when the tip is fixed but the orientation of the writing instrument or stylus is changed in the instrument receiving feature 362. Thus, a digital ruler may be advantageously configured such that the clearance dimension CL is relatively small (e.g., at most 2.0 mm, or 1.5 mm, or even less, in various embodiments). As previously indicated, it may also be advantageous for the tip-to-edge dimension TTED, which is the distance along the Y direction between a surface or abutting edge of the instrument tip seating portion 365 of the instrument receiving feature 362 and the edge of the digital ruler housing 206 that faces it (e.g., the outward-facing edge of the cover 230), to be relatively small (e.g., at most 3.0 mm, or more advantageously at most 1.5 mm or less, if practical in various embodiments), which provides advantages outlined previously with reference to FIG. 3A.

In one embodiment, the indicator contact 350 may be made of a single piece of metal, and the indicator body 360, molded bottom portion 210 and cover portion 230 may each be made of single pieces of material (e.g., molded plastic) including the associated X-Y misalignment constraint surfaces and the alignment runner configuration. It will be appreciated that these types of materials (e.g., molded plastic) can be fabricated at low cost and with high accuracy which increases the performance of the digital ruler, while also utilizing a limited number of parts and a simplified assembly which further reduce the costs of the digital ruler. It will be appreciated that in other embodiments an indicator body may be molded around an indicator contact, or the indicator body and indicator contact may be formed from a single piece of conductive plastic, or the like. Thus, it will be appreciated that the particular configuration of parts shown and described herein is exemplary only, and not limiting.

FIG. 5B is a diagram including a second exemplary self-aligning yaw alignment arrangement YAA' usable as a functional replacement for the first exemplary self-aligning yaw alignment arrangement YAA of FIG. 5A. More generally, the alignment arrangement within the dashed box 590B of FIG. 5B may be used as a functional replacement for the alignment arrangement AA within the dashed box 590A of FIG. 5A. The self-aligning yaw alignment arrangement YAA' includes a yaw alignment guide 585 and an alignment track 515 having a triangular cross section that provides a self-aligning angled interference fit according to previously outline principles. The track arrangement TA' comprises a flat roll guide 586 and track 516.

FIG. 6 is a diagram of an isometric bottom view of the sliding position indicator 240 of FIGS. 5A and 3A. As shown in FIG. 6, the sliding position indicator 240 includes the indicator contact 350 and the indicator body 360, and may consist of only these elements in some embodiments. The external portion 360E of the indicator body 360 includes the instrument receiving feature 362. The indicator contact 350, which includes the spring legs 352 and 354 with the respective contact pads 353 and 355, may be aligned and/or attached to the internal portion 360I of the indicator body 360 by a set of four mounting and alignment posts 612. In one embodiment, the indicator contact 350 may be formed from a single piece of metal, and the indicator body 360 may be formed from a single piece of molded plastic, which may include the four mounting and alignment posts 612. The indicator body 360 may include a groove 562 that provides X-Y misalignment constraint surfaces 471A and 471B.

Figure 7:
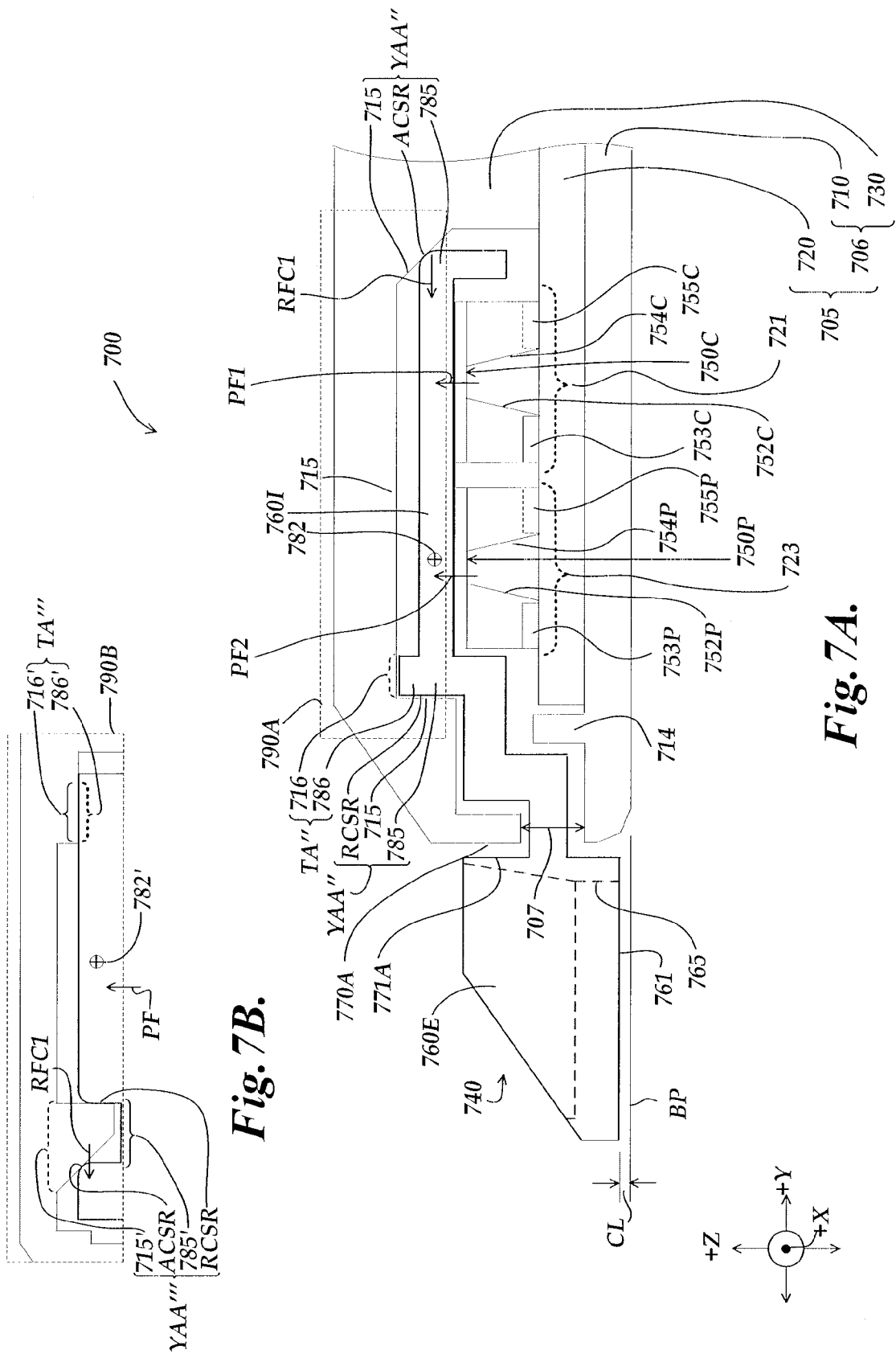
FIG. 7A is a diagram of a cross-section of an end view of a region surrounding a sliding position indicator, and including a third exemplary self-aligning yaw alignment arrangement and a second exemplary preload arrangement.
FIG. 7B is a diagram of a fourth exemplary self-aligning yaw alignment arrangement usable in place of the third exemplary yaw alignment runner arrangement of FIG. 5A.

FIG. 7A is a diagram of a cross section of an end view of a portion of a digital ruler 700, emphasizing a region surrounding a sliding position indicator 740, and including a third exemplary self-aligning yaw alignment arrangement YAA" and a second exemplary preload arrangement. It will be appreciated that the components and features shown in FIG. 7A are analogous to those shown in FIG. 5A, and may be understood by analogy, except as otherwise described below. One primary difference is that the sliding position indicator 740 includes a preload arrangement comprising the compliant preload element 750P in addition to the compliant portion of the indicator contact 750C. These compliant elements act in combination to provide a total preload force that functions as previously described with reference to the preload force component PF of FIG. 5A. The compliant preload element 750P includes spring legs 752P and 754P with respective contact pads 753P and 755P, while the indicator contact 750C includes a compliant portion comprising spring legs 752C and 754C with respective contact pads 753C and 755C.

In the embodiment shown in FIG. 7A, the indicator contact 750C is aligned with a measuring track 721 located in a region indicated by a dashed bracket, and provides electrical connections according to the same principles as described for the indicator contact 350. The indicator contact 750C may be designed to provide a weak preload force PF1 that is just sufficient to provide good electrical contact, with the intent of minimizing wear on all electrical contact elements and minimizing the associated friction. The compliant preload element 750P is aligned with a sliding region 723 indicated by a dashed bracket, which provides no electronic functions, and which may include an anti-friction coating, or the like. The compliant preload element 750P may be designed to provide a preload force PF2 such that a total preload force [PF1+PF2] is sufficient to insure that the self-aligning yaw alignment arrangement YAA" self-aligns according to previously described principles, and addresses other considerations outlined below, without increasing force and wear on the indicator contact pads 753C and 755C and the associated scale contacts.

Regarding preload force considerations, in some embodiments it is desirable that a sliding position indicator be subject to low frictional forces, so that it may be positioned precisely by a writing instrument or stylus, without "stiction" effects, as previously outlined. Another consideration is that it is desirable that the sliding position indicator not move under its own weight when a digital ruler is used in a vertical position, or is lightly bumped, or the like. Another consideration is a tip of a pencil may broken by a lateral force (e.g., a lateral force that is a combination of friction forces acting on the sliding position indicator and between the forces pencil tip and the work surface) of roughly 1-2 newtons. Considering various coefficients of friction that may arise between contact pads of a sliding position indicator and their mating surfaces in a digital ruler, and considering the various geometric relationships between the various mating surfaces, in some embodiments it may be desirable that a preload arrangement provide a preload force component along the Z direction that is at most 2.5 newtons (e.g., when various coefficients of friction are relatively low). In other embodiments, it may be desirable that a preload arrangement provide a preload force component along the Z direction that is at most 1.25 newtons, or at most 0.75 newtons, or even less, (e.g., when various coefficients of friction are moderate or high).

The alignment arrangement shown in FIG. 7A comprises the third exemplary self-aligning yaw alignment arrangement YAA", a track arrangement TA". The self-aligning yaw alignment arrangement YAA" comprises an alignment track 715 and a yaw alignment guide 785 that each have substantial width dimension along the Y direction. At one side of the width dimension, the yaw alignment guide 785 slides along the alignment track 715 on an angled contact surface region ACSR, and at the other side of the width dimension, the yaw alignment guide 785 slides along the alignment track 715 on an opposing restraining contact surface region RCSR, to provide self-alignment according to previously described principles. The track arrangement TA" shown in FIG. 7A comprises a flat track 716 along the cover 730 and a flat surface of the indicator body 760 that provides a roll guide 786, which slides along the track 716. It will be appreciated that the self-aligning yaw alignment arrangement YAA", despite its width, provides a self-aligning angled interference fit that provides an angled contact surface region ACSR and an opposing restraining contact surface region RCSR that provide self-alignment according to previously outlined principles.

FIG. 7A also shows that the digital ruler 700 is configured such that a first set of X-Y misalignment constraint surfaces 770 (e.g., 770A) are provided by elements of the ruler body assembly 705, and a second set of X-Y misalignment constraint surfaces 771 (e.g., 771A) are provided by the indicator body 760. These sets of X-Y misalignment constraint surfaces operate according to previously described X-Y misalignment constraint principles. It may be noted that the restraining contact surface region RCSR is perpendicular to Y direction in the embodiment shown in FIG. 7A, and thus may also fulfill the function of providing X-Y misalignment constraint surfaces that are effective for constraining the indicator body 760 along the minus-Y direction.

FIG. 7B is a diagram including a fourth exemplary self-aligning yaw alignment arrangement YAA''' usable as a functional replacement for the third exemplary self-aligning yaw alignment arrangement YAA" of FIG. 7A. More generally, the alignment arrangement within the dashed box 790B of FIG. 7B may be used as a functional replacement for the alignment arrangement within the dashed box 790A of FIG. 7A. The self-aligning yaw alignment arrangement YAA''' includes a yaw alignment guide 785' and an alignment track 715'. In contrast to previously outlined embodiments, in the self-aligning yaw alignment arrangement YAA''' the alignment track 715' has a convex cross section, and the yaw alignment guide 785' has a concave cross section. It will be appreciated that the self-aligning yaw alignment arrangement YAA''' nevertheless provides a self-aligning angled interference fit that provides an angled contact surface region ACSR and an opposing restraining contact surface region RCSR that provide self-alignment according to previously outlined principles. The track arrangement TA' comprises a flat roll guide 786' and track 716', as shown.

Figure 8:
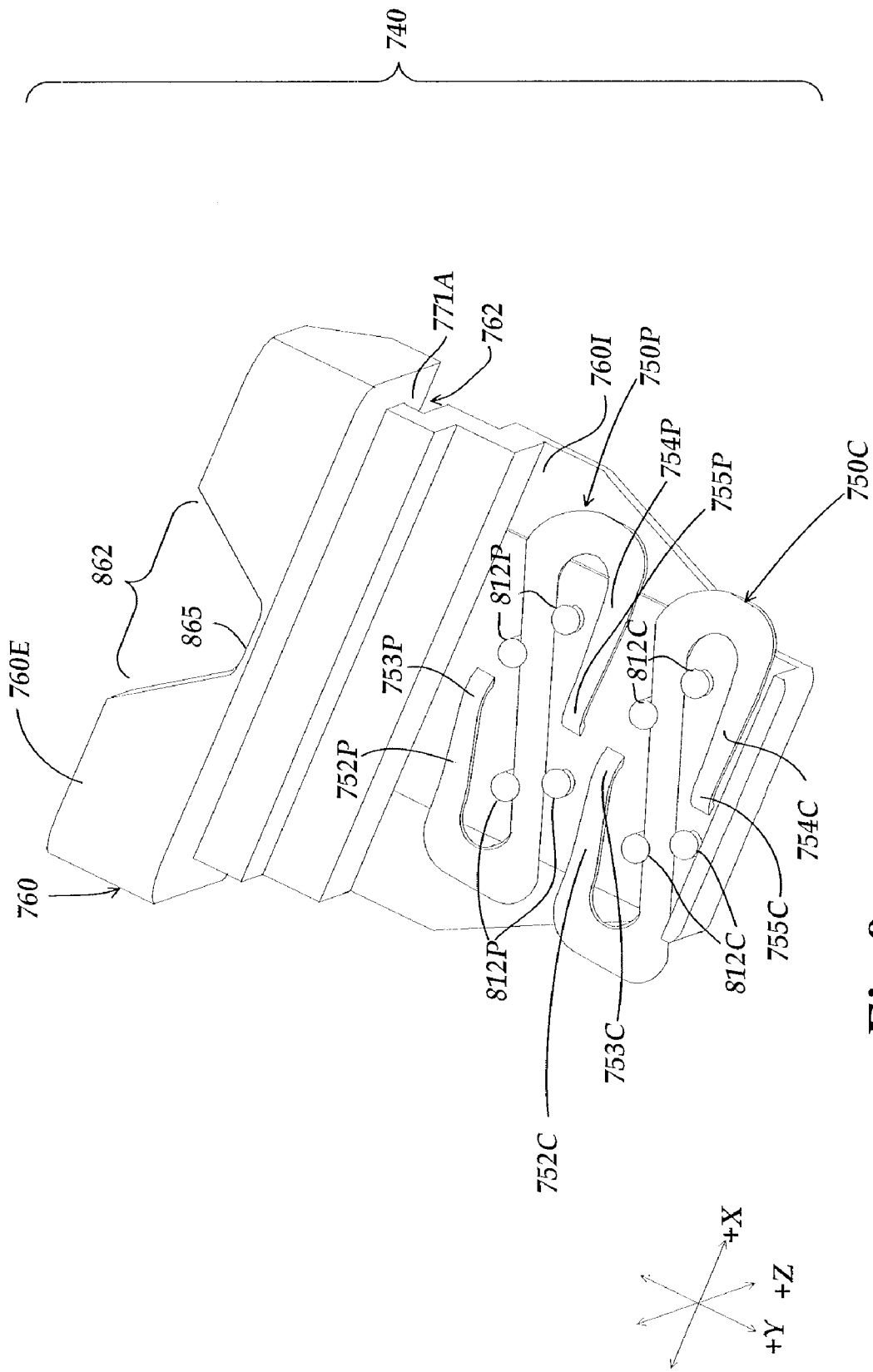
FIG. 8 is a diagram of an isometric bottom view of the sliding position indicator of FIG. 7A.

FIG. 8 is a diagram of an isometric bottom view of the sliding position indicator 740 of FIG. 7A, and its elements features will be understood based on the previous description of analogous elements and features, except as otherwise described below. It will be appreciated that although they appear similar in the FIG. 7A, the two elements 750A and 750B may have different forms in various embodiments (e.g., different thicknesses, different spring leg dimensions, different contact end sizes, etc.), in order to optimize each element for its respective functions as previously outlined with reference to FIG. 7A.

Figure 9A:
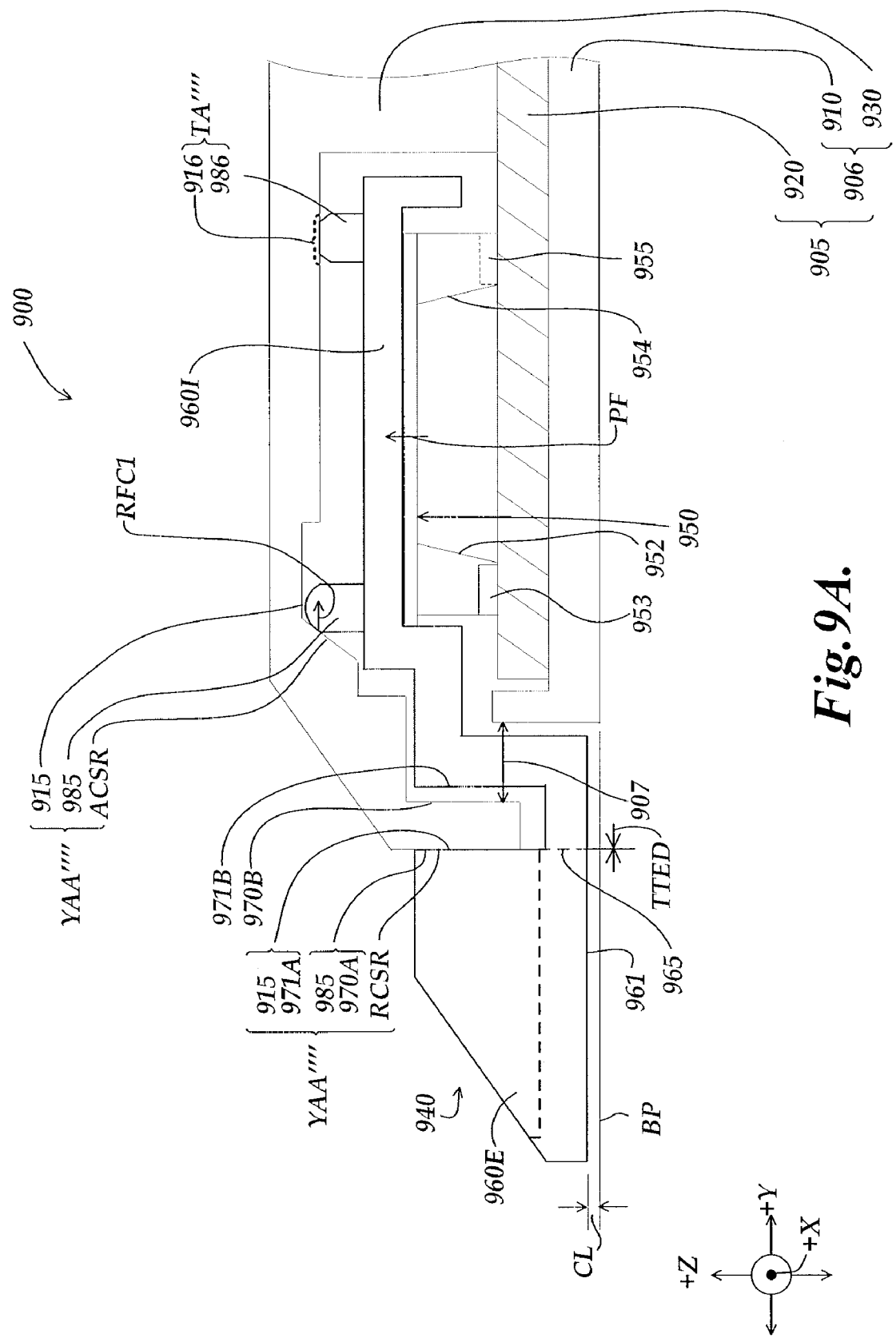
FIG. 9A is a diagram of a cross-section of an end view of a region surrounding a fifth exemplary self-aligning yaw alignment arrangement.

FIG. 9A is a diagram of a cross section of an end view of a portion of a digital ruler 900, emphasizing a region surrounding a sliding position indicator 940, and including a fifth exemplary self-aligning yaw alignment arrangement YAA"". It will be appreciated that the components and features shown in FIG. 9A are analogous to those shown in FIG. 5A, and may be understood by analogy, except as otherwise described below. One primary difference between FIGS. 9A and 5A relates to the self-aligning yaw alignment arrangement YAA"". The self-aligning yaw alignment arrangement YAA"" comprises an alignment track 915 and a yaw alignment guide 985 that each have substantial width dimension along the Y direction. In addition, in contrast to previously outlined embodiments, one of the contact surface regions of the self-aligning yaw alignment arrangement YAA"" includes a surface on the exterior portion 960E of the sliding position indicator 940. In particular, at one portion of the yaw alignment arrangement YAA"" a surface of the yaw alignment guide 985 that is located on the internal portion 360I slides along the alignment track 915 on an angled contact surface region ACSR, and at another portion of the of the yaw alignment arrangement YAA"" a surface of the yaw alignment guide 985 that is located on the exterior portion 360E slides along a restraining contact surface region RCSR, to provide self-alignment according to previously described principles. The track arrangement TA"" shown in FIG. 7A comprises a flat track 916 along the cover 930 and a flat surface of the indicator body 960 that provides a roll guide 986, which slides along the track 916. It will be appreciated that the self-aligning yaw alignment arrangement YAA"", like all of the foregoing embodiments, provides a self-aligning angled interference fit that provides an angled contact surface region ACSR and an oppositely facing restraining contact surface region RCSR that provide self-alignment according to previously outlined principles.

FIG. 9A also shows that the digital ruler 900 is configured such that a first set of X-Y misalignment constraint surfaces 970 (e.g., 970B) are provided by elements of the ruler body assembly 905, and a second set of X-Y misalignment constraint surfaces 971 (e.g., 971B) are provided by the indicator body 960. These sets of X-Y misalignment constraint surfaces operate according to previously described X-Y misalignment constraint principles. It may be noted that surfaces of the yaw alignment guide 985 and the alignment track 915 at the restraining contact surface region RCSR are perpendicular to the Y direction in the embodiment shown in FIG. 9A, and may also fulfill the function of providing X-Y misalignment constraint surfaces 970A and 971A, respectively, that are effective for constraining the indicator body 960 along the +Y direction. Thus, these surfaces provide an example of a "dual-purpose" surface 985, 970A of the yaw alignment guide 985 and a "dual-purpose" surface 915, 971A of alignment track 915.

It will also be appreciated that the embodiment of FIG. 9A may provide a minimum possible dimension TTED. As previously indicated, it may also be advantageous for the tip-to-edge dimension TTED, which is the distance along the Y direction between a surface or abutting edge of the instrument tip seating portion 965 of the instrument receiving feature and the edge of the digital ruler housing 906 that faces it (e.g., the outward-facing edge of the cover 930), to be relatively small. FIG. 9A shows and embodiment where the tip-to-edge dimension TTED is approximately zero, which may maximize the related advantages outlined previously with reference to FIG. 3A.

It will be appreciated that for the configuration shown in FIG. 9A, the dual-purpose surface 985, 970A of the yaw alignment guide 985 is included in the set of X-Y misalignment constraint surfaces 970 and the dual-purpose surface 915, 971A of the alignment track 915 that is included in the set of X-Y misalignment constraint surfaces 971. These surfaces contact one another, even in the absence of external forces acting on the sliding position indicator, according to their function in the self-aligning angled interference fit of the yaw alignment guide 985 and the alignment track 915, as outlined above. However, except for these dual-purpose surfaces, the sets of X-Y misalignment constraint surfaces 970 and 971 are configured such that each member of the set of X-Y misalignment constraint surfaces 971 is separated by a gap from its opposing proximate member of the set of X-Y misalignment constraint surfaces 970 when the yaw alignment guide 985 is seated against, and repeatably aligned relative to, the alignment track 915. In general, such a configuration helps provide a sliding position indicator with repeatable alignment and low frictional forces.

Figure 9B:
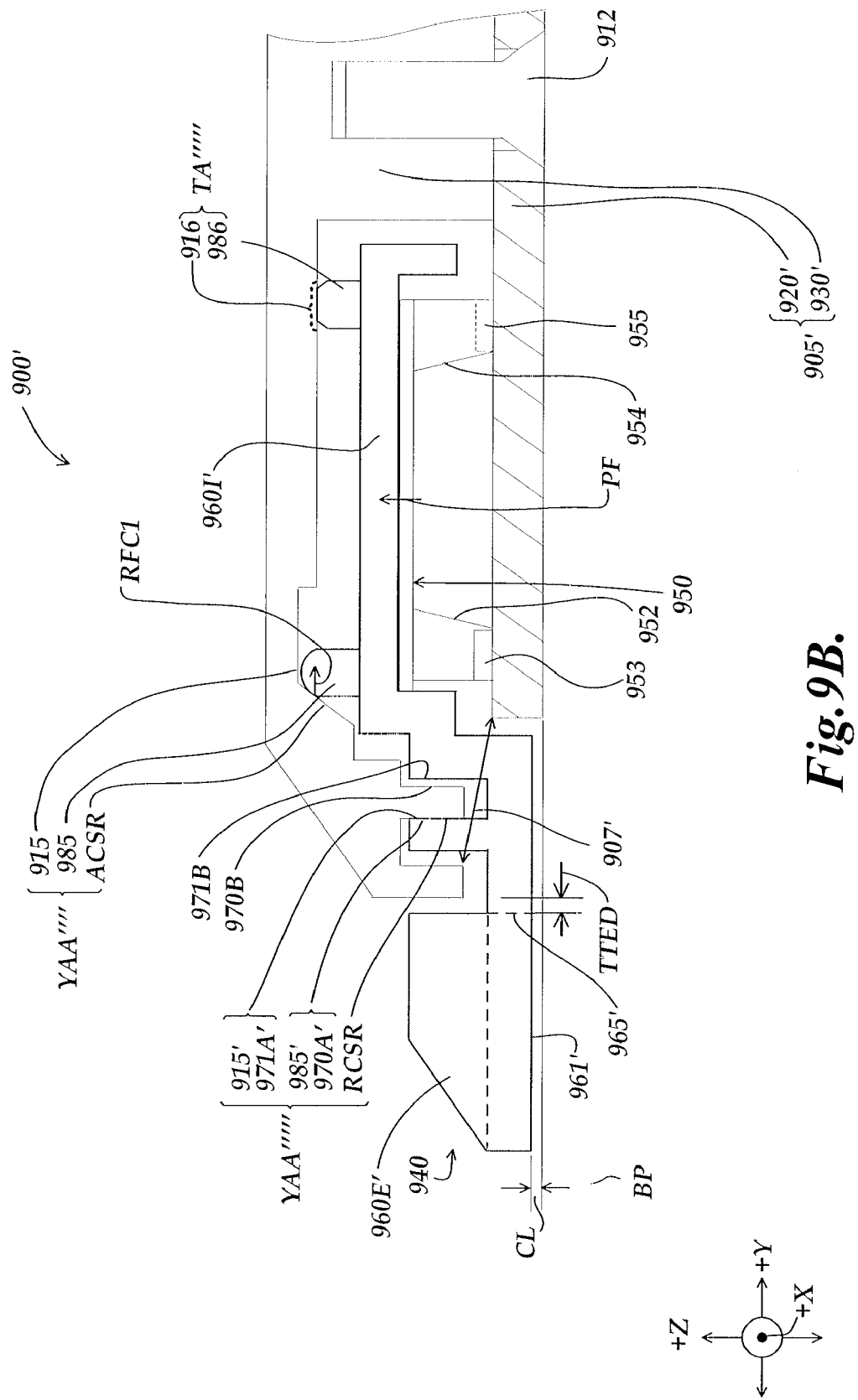
FIG. 9B is a diagram of a cross-section of an end view of a region surrounding a sixth exemplary self-aligning yaw alignment arrangement, and showing a ruler body assembly that uses a printed circuit board as a bottom portion.

FIG. 9B is a diagram of a cross section of an end view of a portion of a digital ruler 900', emphasizing a region surrounding a sliding position indicator 940', and including a sixth exemplary self-aligning yaw alignment arrangement YAA''''. It will be appreciated that the components and features shown in FIG. 9B are analogous to those shown in FIG. 9A, and may be understood by analogy, except as otherwise described below. One difference between FIGS. 9B and 9A relates to the self-aligning yaw alignment arrangement YAA''''. In contrast to the self-aligning yaw alignment arrangement YAA'''' of FIG. 9A, each of the contact surface regions ACSR and RCSR includes surfaces on the interior portion of the sliding position indicator 940'. It will be appreciated that the self-aligning yaw alignment arrangement YAA'''', like all of the foregoing embodiments, provides a self-aligning angled interference fit that provides an angled contact surface region ACSR and an oppositely facing restraining contact surface region RCSR that provide self-alignment according to previously outlined principles. In comparison to the embodiment of FIG. 9A, the embodiment of FIG. 9B may not provide the minimum possible dimension TTED provided in the embodiment of FIG. 9A. However, the restraining contact surface region RCSR is in a protected environment, rather than located externally, so that contamination is less likely to jeopardize the flatness and/or low friction which is desirable at the contact surface region RCSR. In addition, the moment arm along the Y direction between an X direction external force acting at the instrument tip seating portion 965' and any X direction frictional forces acting on the restraining contact surface region RCSR still remains smaller than many other embodiments, which is advantageous for reasons previously discussed.

Another difference between FIGS. 9B and 9A relates to the use of the printed circuit board assembly 920' as the bottom portion of the digital ruler 900'. That is, the separate molded bottom portion 910 shown in FIG. 9A has been eliminated, to reduce the cost of the digital ruler 900'. The printed circuit board assembly 920' may be adapted to be coated or covered to satisfy any circuit insulation requirements, and fastened directly to the cover 930' (e.g., by screws 912).

FIGS. 10 and 11 are diagrams that correspond to each other, and that schematically illustrate one exemplary layout and connection scheme that may be used to implement the first exemplary scale contact configuration 322A of FIG. 3A. As shown in FIG. 10, a set of scale contacts 1024A within a first measuring subtrack portion 1021' (corresponding to the scale contacts 324A of FIG. 3A) and a set of elongated scale contacts 1026A within a second measuring subtrack portion 1021'' (corresponding to the elongated scale contact 326A of FIG. 3A) are disposed along a measuring track 1021 (corresponding to the measuring track 221 of FIG. 3A). The scale contacts 1024A are shown corresponding to a number of representative positions A-L, and a schematically illustrated sliding position indicator contact connection MC is shown at the representative position A. The scale contacts 1024A and 1026A are shown to be arranged in three representative segments SEG1-SEG3 of a measuring scale contact configuration, which may generally include additional similar segments extending along the measuring axis direction. It will be understood that additional scale contacts 1024A are arranged at a consistent scale pitch throughout each segment, but are not shown, for clarity. The scale contact configuration may be identical in each segment; however, the electrical connection configuration will vary in each segment, as indicated by the input numbers 1-to-N and as explained below.

FIG. 11 schematically illustrates a number of circuit nodes (e.g. input nodes) of the digital ruler signal processing and display circuit as horizontal bars numbered 1-to-N, and shows which of those circuit nodes are connected together as the indicator contact connection MC is positioned at each of the representative positions A-L. For example, at the position A the N and N–1 inputs are connected, at the position F the N–1 and N–3 are connected, etc. In one embodiment, the signal processing and display circuit may implement a measuring cycle wherein during N sub-cycles a voltage is applied to each of the circuit nodes 1-to-N in turn. This corresponds to "activating" each of the scale contacts 1026A of the segments SEG1, SEG2, SEG3, and so on, with that voltage, in turn. During each such sub-cycle, the signal processing and display circuit then determines which of the remaining N–1 circuit nodes (corresponding to the scale contacts 1024A in a particular segment) is connected to that voltage through the currently activated scale contact 1026A, in order to identify the measuring position of the indicator contact connection MC. It will be appreciated that in each respective segment SEG1, SEG2, and so on, the input that is connected to the respective scale contact 1026A is excluded from the respective group of scale contacts 1024A for that respective segment. Furthermore, because the "polarity" of a connection between a pair of scale contacts may be known based on the sub-cycle during which it occurs, the connection "N-to-N1" may be distinguished from the connection "N1-to-N", for example. Such signal processing allows the measuring scale contact configuration schematically illustrated in FIG. 10 to provide an absolute position code, meaning that every measuring position of the indicator contact connection MC along the measuring track 1021 corresponds to a unique combination of signals on the circuit nodes 1-to-N. Approximately 1000 detectable measuring positions (which correspond to the number of scale contacts 1024A) may be provided using approximately 33 circuit nodes, using the scheme outlined above.

Figure 12:
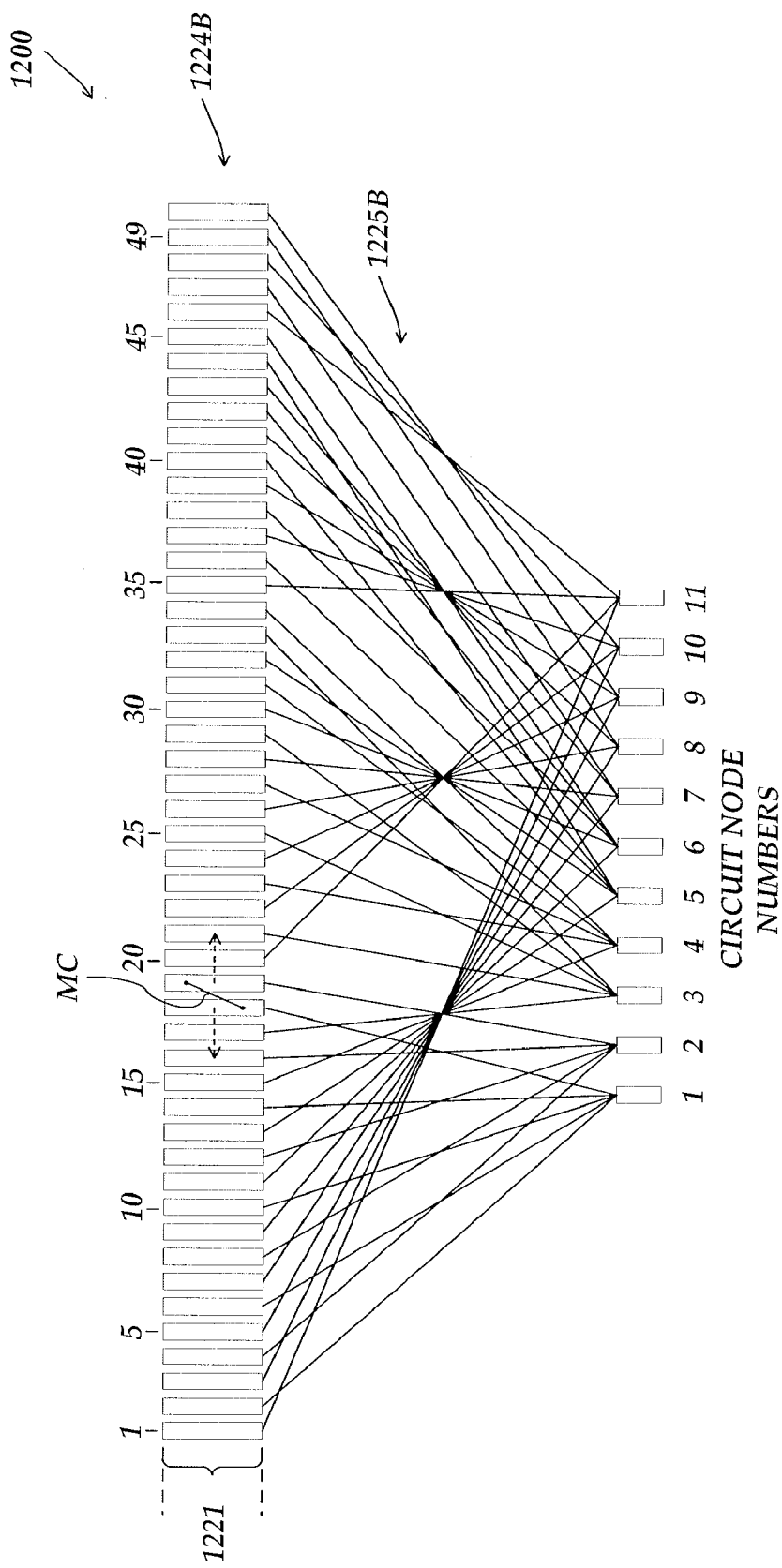
FIG. 12 is a diagram that schematically illustrates one exemplary layout and connection scheme that may be used to implement the second exemplary scale contact configuration of FIG. 3A.

FIG. 12 is a diagram that schematically illustrates one exemplary layout and connection scheme that may be used to implement the second exemplary scale contact configuration 322B of FIG. 3A. As shown in FIG. 12, a representative set of 50 scale contacts 1224B (corresponding to the scale contacts 324B of FIG. 3A) are disposed along a measuring track 1221 (corresponding to the measuring track 221 of FIG. 3A). The scale contacts 1224B are shown to correspond to 49 positions, and a schematically illustrated sliding position indicator contact connection MC is shown at the position 18. FIG. 12 also schematically shows 11 representative circuit nodes (e.g., input nodes) of the digital ruler signal processing and display circuit as pads numbered 1-to-11, and the connection lines 1225B shows that each of those circuit nodes may be connected to a plurality of the scale contacts 1224B. Inspection of FIG. 12 shows that as the indicator contact connection MC is positioned at each of the positions 1-to-49, the illustrated measuring scale contact configuration provides a connection between a unique pair of the circuit nodes 1-to-11, to provide an absolute position code corresponding to that position. For example, at the position 18, circuit nodes 1 and 2 are connected as indicated by the connection lines 1225B. The digital ruler signal processing and display circuit may thus determine the measuring position based on which pair of circuit nodes is connected. It will be appreciated that the scheme described above using a representative set of 50 scale electrodes may be extended by analogy. The number of detectable measuring positions (which corresponds to the number of scale contacts) may be greatly increased with a moderate increase in the number of circuit nodes. For example, 1000 measuring positions may be detected with 1001 scale contacts appropriately connected to approximately 46 circuit nodes. A set of efficient and unambiguous connections between the various circuit nodes and the various scale contacts may be determined without undue experimentation, by systematic analysis (e.g., by simple computer search and sort algorithms) or by trial and error, or the like.

It will be appreciated that numerous other scale contact layout and connection schemes are possible, including some that may be used in conjunction with multi-contact sliding position indicators (e.g., with three or more contact points) that connect more than two circuit nodes together for each measuring position, enabling the use of fewer circuit nodes for a given number of scale contacts and measuring positions, and/or simpler or faster signal processing schemes, or the like.

Although the embodiments illustrated and described herein have provided configurations having a straight measuring axis, it will be appreciated that the design principles and concepts disclosed herein may be readily adapted to provide embodiments that are configured to provide a curved or circular measuring axis and/or to measure arcs or angles. In such cases, by analogy with the previous description, the X direction may be defined to be parallel to the measuring axis direction at each measuring position, the Y direction may be a radial direction orthogonal to the X direction and approximately parallel to the surface plane of the measuring track and/or the circuit substrate, and the Z direction may be normal to the X-Y plane. It will be understood that the term digital ruler as used herein is intended to include such curved measuring axis configurations within its scope.

Although the embodiments disclosed herein describe a sliding indicator positioned to slide in a slot located along an outward-facing edge of a digital ruler, it will be appreciated that a digital ruler may include an elongated opening within, and surrounded by, the ruler body assembly. Such an elongated opening may expose a working surface (e.g., a piece of paper) through the ruler body assembly, and may provide an "inward-facing" edge and a slot surrounded by the ruler body assembly. Functionally, with respect to the sliding position indicator features disclosed herein, such an inward-facing edge is analogous to the "outward-facing" edge and slot included in the drawings and description herein. It will be appreciated that the sliding position indicator features and alignment features disclosed herein may be adapted for use in embodiments that include such an inward-facing edge. Thus, such embodiments fall within the scope of this invention.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A digital ruler comprising a ruler body assembly having a base plane positionable against a work surface and a sliding position indicator, the sliding position indicator extending through and moving along a slot in the ruler body assembly and positionable at a plurality of unique measuring positions along the direction of the measuring axis of the digital ruler, the ruler body assembly comprising:
   a housing comprising a cover portion;
   a first set of X-Y misalignment constraint surfaces that extend along the direction of the measuring axis; and
   a printed circuit board assembly including:
      a printed circuit board,
      a measuring track portion comprising a plurality of measuring scale contacts arranged along a first surface of the printed circuit board to provide a measuring scale contact configuration that extends along the measuring axis, and
      a signal processing and display circuit configured to detect unique sets of measuring scale contacts that are electrically connected to the sliding position indicator depending on its position along the measuring axis, wherein each unique set of electrically connected measuring scale contacts is indicative of a corresponding unique measuring position along the measuring axis; and the sliding position indicator comprising:
   an indicator body including a second set of X-Y misalignment constraint surfaces, wherein each member of the second set of X-Y misalignment constraint surfaces is located opposing a proximate member of the first set of X-Y misalignment constraint surfaces;
   an indicator contact that comprises a conductive material configured to provide a plurality of conductively connected contact pads and a compliant portion configured to force the contact pads against the measuring scale contacts to connect them to define the unique sets of electrically connected measuring scale contacts, wherein:
   hypothetical orthogonal coordinate directions may be defined relative to the digital ruler such that an X direction is parallel to the direction of the measuring axis, a Y direction is orthogonal to the X direction and approximately parallel to the base plane, and a Z direction is normal to an X-Y plane that is parallel to the X and Y directions;
   the first and second sets of X-Y misalignment constraint surfaces are arranged to constrain a maximum misalignment of the sliding position indicator relative to the ruler body assembly for misalignments in the X-Y plane, as the sliding position indicator is moved along the slot; and
   the sliding position indicator comprises an instrument receiving feature formed in an external portion of the indicator body that extends outside the ruler body assembly from the slot, the instrument receiving feature configured to receive an instrument tip that is positioned against the work surface and operably engage with the instrument tip such that the instrument tip moves the sliding position indicator in conjunction with the instrument tip, when the instrument tip is moved along the direction of the measuring axis.

2. The digital ruler of claim 1, wherein a bottom plane of the external portion of the indicator body proximate to the instrument receiving feature has a clearance dimension along the Z direction relative to the base plane that is at most 2.0 mm.

3. The digital ruler of claim 2, wherein the bottom plane of the external portion of the indicator body proximate to the instrument receiving feature has a clearance dimension along the Z direction relative to the base plane that is at most 1.5 mm.

4. The digital ruler of claim 1, wherein the instrument receiving feature includes an abutting edge for operably engaging the instrument tip, and the abutting edge has thickness dimension along the Z direction that is at most 2.0 mm, and the external portion of the indicator body proximate to the instrument receiving feature is configured with clearance surrounding the top of the abutting edge such that when a side surface of the instrument tip is operably engaged with the abutting edge, that side surface of the instrument tip may be inclined up to at least 30 degrees from the Z direction, at least in an X-Z plane that is parallel to the X and Z directions, without contacting the external portion of the indicator body except at the abutting edge.

5. The digital ruler of claim 4, wherein a bottom plane of the external portion of the indicator body proximate to the abutting edge of the instrument receiving feature has a clearance dimension along the Z direction relative to the base plane that is at most 2.0 mm, and the abutting edge extends at most 4.0 mm above the base plane along the Z direction.

6. The digital ruler of claim 1, wherein the instrument receiving feature includes an instrument tip seating portion for operably engaging the instrument tip, the instrument tip seating portion including that portion of the instrument receiving feature which is closest along the Y direction to an edge of the cover portion that is adjacent to the slot and that faces the external portion of the of the indicator body, and a tip-to-edge dimension along the Y direction between the instrument seating portion and the edge of the cover portion that is adjacent to the slot is at most 3.0 mm.

7. The digital ruler of claim 6, wherein the tip-to-edge dimension is at most 1.5 mm.

8. The digital ruler of claim 6, wherein the instrument receiving feature comprises a notch shape and the instrument tip seating portion comprises an apex of the notch shape.

9. The digital ruler of claim 1, wherein:
the housing comprises an alignment track that extends along the direction of the measuring axis;
the sliding position indicator comprises:
a yaw alignment guide located on an internal portion of the sliding position indicator that extends inside the ruler body assembly from the slot, wherein the yaw alignment guide is located proximate to the alignment track, and
a preload arrangement located on the interior portion of the sliding position indicator and comprising at least one compliant element, wherein the preload arrangement is configured to provide a preload force component that acts on the indicator body and that is directed along a direction away from the measuring scale contacts and toward the alignment track, and the at least one compliant element comprises the compliant portion of the indicator contact;
the alignment track and the yaw alignment guide are configured with cross sections that form a self-aligning angled interference fit such that, in the absence of an external force acting on the sliding position indicator, the preload force component acting on the indicator body forces the yaw alignment guide to contact the alignment track at an angled contact surface region and at an opposing restraining contact region defined by the self-aligning angled interference fit, and forces the yaw alignment guide to seat against the alignment track such that reaction force components at the angled contact surface region and the opposing restraining contact region force the yaw alignment guide to be repeatably aligned relative to the alignment track and relative to the direction of the measuring axis; and
the first and second sets of X-Y misalignment constraint surfaces are configured such that at least one member of the second set of X-Y misalignment constraint surfaces is separated by a gap from its opposing proximate member of the first set of X-Y misalignment constraint surfaces when the yaw alignment guide is seated against, and repeatably aligned relative to, the alignment track.

10. The digital ruler of claim 9, wherein none of the surfaces of the alignment track and the yaw alignment guide are included in the first and second sets of X-Y misalignment constraint surfaces, and the first and second sets of X-Y misalignment constraint surfaces are configured such that each member of the second set of X-Y misalignment constraint surfaces is separated by a gap from its opposing proximate member of the first set of X-Y misalignment constraint surfaces when the yaw alignment guide is seated against, and repeatably aligned relative to, the alignment track.

11. The digital ruler of claim 9, wherein a dual-purpose surface of the yaw alignment guide is included in the second set of X-Y misalignment constraint surfaces and it contacts a dual-purpose surface of the alignment track that is included in the first set of X-Y misalignment constraint surfaces, and except for the dual-purpose surfaces, the first and second sets of X-Y misalignment constraint surfaces are configured such that each member of the second set of X-Y misalignment constraint surfaces is separated by a gap from its opposing proximate member of the first set of X-Y misalignment constraint surfaces when the yaw alignment guide is seated against, and repeatably aligned relative to, the alignment track.

12. The digital ruler of claim 9, wherein the alignment track, the yaw alignment guide, and the first and second sets of X-Y misalignment constraint surfaces are configured such that in the presence of an external force which acts on the sliding position indicator to overcome the preload force component and prevent the yaw alignment guide from being repeatably aligned relative to the alignment track, the first and second sets of X-Y misalignment constraint surfaces constrain the maximum X-Y misalignment of the sliding position indicator relative to the ruler body assembly to maintain the alignment guide at least partially aligned with the alignment track such that the self-aligning angled interference fit is automatically reestablished as the external force is removed.

13. The digital ruler of claim 9, wherein the preload arrangement is configured to provide a preload force component of at most 2.5 newtons.

14. The digital ruler of claim 13, wherein the preload arrangement is configured to provide a preload force component of at most 1.25 newtons.

15. The digital ruler of claim 14, wherein the preload arrangement is configured to provide a preload force component of at most 0.75 newton.

16. The digital ruler of claim 9, wherein the at least one compliant element of the preload arrangement consists of the compliant portion of the indicator contact.

17. The digital ruler of claim 1, wherein the slot is located along an outward-facing edge of the ruler body assembly between the cover portion and the printed circuit board.

18. The digital ruler of claim 1, wherein the housing further comprises a molded bottom portion, the cover portion and the molded bottom portion encase the printed circuit board assembly, and the slot is located along an outward-facing edge of the ruler body assembly between the cover portion and the molded bottom portion.

19. The digital ruler of claim 18, wherein the printed circuit board assembly comprises a battery, and the battery extends through a cutout in the printed circuit board and is constrained relative to the printed circuit board such that the printed circuit board is located within a span commensurate with the thinnest dimension of the battery along the Z direction.

20. The digital ruler of claim 1, further comprising at least one additional ruler accessory, including at least one of (a) a flip out foot that extends from the ruler body assembly to a location along the measuring axis direction relative to the external portion of the sliding position indicator, so that the digital ruler may be used for a caliper type measurement operation based on a distance between the flip out foot and the sliding position indicator, and (b) a rod that engages the sliding position indicator, wherein the rod is configured with an end that extends past an end of the ruler body assembly, so that the sliding position indicator may be positioned based on a distance between the end of the rod and the end of the ruler body assembly, so that the digital ruler may be used for a depth gauge type measurement operation.

21. The digital ruler of claim 1, further comprising one of a plurality of zero switches located along the housing, and a tapping sensor that is located along the surface of the housing for activating a zeroing function.

22. The digital ruler of claim 1, wherein the digital ruler includes a zeroing mode that is activated by performing a predefined slider motion sequence without requiring the utilization of a zeroing switch.

23. The digital ruler of claim 1, wherein the measuring axis direction corresponds to one of a straight measuring axis and a circular measuring axis.

* * * * *